US011341002B1

(12) United States Patent
Izad et al.

(10) Patent No.: US 11,341,002 B1
(45) Date of Patent: May 24, 2022

(54) DIFFERENTIAL CLOCK SKEW DETECTOR

(71) Applicant: Cadence Design Systems, Inc., San Jose, CA (US)

(72) Inventors: Mehran Mohammadi Izad, San Jose, CA (US); Aida Varzaghani, Mountain View, CA (US); Bardia Bozorgzadeh, San Jose, CA (US); Stefanos Sidiropoulos, Palo Alto, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 57 days.

(21) Appl. No.: 17/061,348

(22) Filed: Oct. 1, 2020

(51) Int. Cl.
 *G06F 1/10* (2006.01)
 *G06F 11/16* (2006.01)
(52) U.S. Cl.
 CPC ............ *G06F 11/1604* (2013.01); *G06F 1/10* (2013.01)
(58) Field of Classification Search
 CPC ............................... G06F 1/10; G06F 11/1604
 USPC .......................................................... 327/292
 See application file for complete search history.

(56) References Cited

U.S. PATENT DOCUMENTS

| | | | |
|---|---|---|---|
| 4,646,297 A | 2/1987 | Palmquist et al. | |
| 5,691,656 A * | 11/1997 | Sandusky | G01R 25/00 327/12 |
| 6,622,255 B1 | 9/2003 | Kurd et al. | |
| 7,697,652 B2 | 4/2010 | Jeong et al. | |
| 9,647,688 B1 | 5/2017 | Poplack et al. | |
| 9,924,466 B1 | 3/2018 | Leuciuc | |
| 2006/0244505 A1 | 11/2006 | Fung et al. | |
| 2009/0174448 A1 | 7/2009 | Zabinski | |

OTHER PUBLICATIONS

Jim Stiles, "The S-R Phase Detector", The Univ. of Kansas Dept. of EECS, Oct. 22, 2010.

* cited by examiner

*Primary Examiner* — William Hernandez
(74) *Attorney, Agent, or Firm* — Tarolli, Sundheim, Covell & Tummino LLP

(57) ABSTRACT

An IC chip can include a buffer and correction module that receives a set of multiphase clock signals at a given frequency, the buffer and correction module can include a differential skew detector that detects a skew between signals of the set of multiphase clock signals. The skew detector can include a set of SR latches. Differential clock signals of the set of multiphase clock signals are input into each SR latch, and the differential clock signals of the set of multiphase clock signals are set to be 180 degrees out of phase. A voltage difference between a DC component of a first output signal and a DC component of a second output signal of a respective SR latch in the set of SR latches varies as a function of the skew between the differential clock signals of the set of multiphase clock signals.

20 Claims, 10 Drawing Sheets

DIFFERENTIAL CLOCK SKEW DETECTOR

TECHNICAL FIELD

A differential clock skew detector for an integrated circuit (IC) chip is disclosed.

BACKGROUND

The operation of most digital circuits is synchronized by a periodic signal known as a "clock" that dictates the sequence and pacing of the devices on the circuit. This clock is distributed from a single source to all the memory elements of the circuit, which for example could be registers or flip-flops. In a circuit using edge-triggered registers, when the clock edge or tick arrives at a register, the register transfers the register input to the register output, and these new output values flow through combinational logic to provide the values at register inputs for the next clock tick. Ideally, the input to each memory element reaches its final value in time for the next clock tick so that the behavior of the whole circuit can be predicted exactly. The maximum speed at which a system can run must account for the variance that occurs between the various elements of a circuit due to differences in physical composition, temperature, and path length.

Clock skew (sometimes called timing skew) is a phenomenon in synchronous digital circuit systems (such as computer systems) in which the same sourced clock signal arrives at different components at different times. The instantaneous difference between the readings of any two clocks is referred to as the skew of the clocks.

SUMMARY

One example relates to a non-transitory medium having machine-readable instructions characterizing an integrated circuit IC chip, the IC chip can include a buffer and correction module that receives a set of multiphase clock signals at a given frequency, the buffer and correction module can include a differential skew detector that detects a skew between signals of the set of multiphase clock signals. The skew detector can include a set of set-reset (SR) latches, wherein differential clock signals of the set of multiphase clock signals are input into each SR latch. The differential clock signals of the set of multiphase clock signals are set to be 180 degrees out of phase, and a voltage difference between a direct current (DC) component of a first output signal and a DC component of a second output signal of a respective SR latch in the set of SR latches varies as a function of the skew between the differential clock signals of the set of multiphase clock signals.

Another example relates to an IC chip. The IC chip can include a buffer and correction module that receives a set of multiphase clock signals at a given frequency, the buffer and correction module comprising a differential skew detector that detects a skew between signals of the set of multiphase clock signals. The skew detector can include a set of SR latches. A set of differential clock signals of the set of multiphase clock signals are input into each SR latch, and each set of differential clock signals of the set of multiphase clock signals being set to be 180 degrees out of phase. A voltage difference between DC component of a first output signal and a DC component of the second output signal of a respective SR latch in the set of SR latches varies as a function of the skew between a respective set of differential clock signals of the set of multiphase clock signals.

Yet another example relates to an IC chip that includes a first serializer stage comprising a first multiplexer array that encodes a multichannel bitstream based on a four-phase clock signal set at a given frequency to generate a second multichannel bitstream. The IC chip can also include a buffer and correction module that receives the four-phase clock signal set at the given frequency. The buffer and correction module can include a differential error detector that detects a skew between signals of the four-phase clock signal set. The differential error detector can include a first SR latch, wherein a first set of differential clock signals of the four-phase clock signal set are input into the first SR latch, and the first set of differential clock signals of the four-phase clock signal set are set to be 180 degrees out of phase. A DC component of a first output signal and a DC component of a second output signal of the first SR latch varies as a function of the skew between the first set of differential clock signals of the four-phase clock signal set. The differential error detector can include a second SR latch, wherein a second set of differential clock signals of the four-phase clock signal set are input into the second SR latch. The second set of differential clock signals of the four-phase clock signal set are set to be 180 degrees out of phase, and a DC component of a first output signal and a DC component of a second output signal of the second SR latch varies as a function of the skew between the second set of differential clock signals of the four-phase clock signal set. The buffer and correction module can also include a differential error corrector that controls a clock path control module to adjust phases of the four-phase clock signal set to form an adjusted four-phase clock signal set based on data characterizing the skew between the first set of differential signals and the second set of differential signals. The IC chip can further include a second serializer stage having a second plurality of multiplexers that encodes the second multichannel bitstream signal based on the adjusted four-phase clock signal set to generate a serialized data signal.

DETAILED DESCRIPTION

Figure 1:
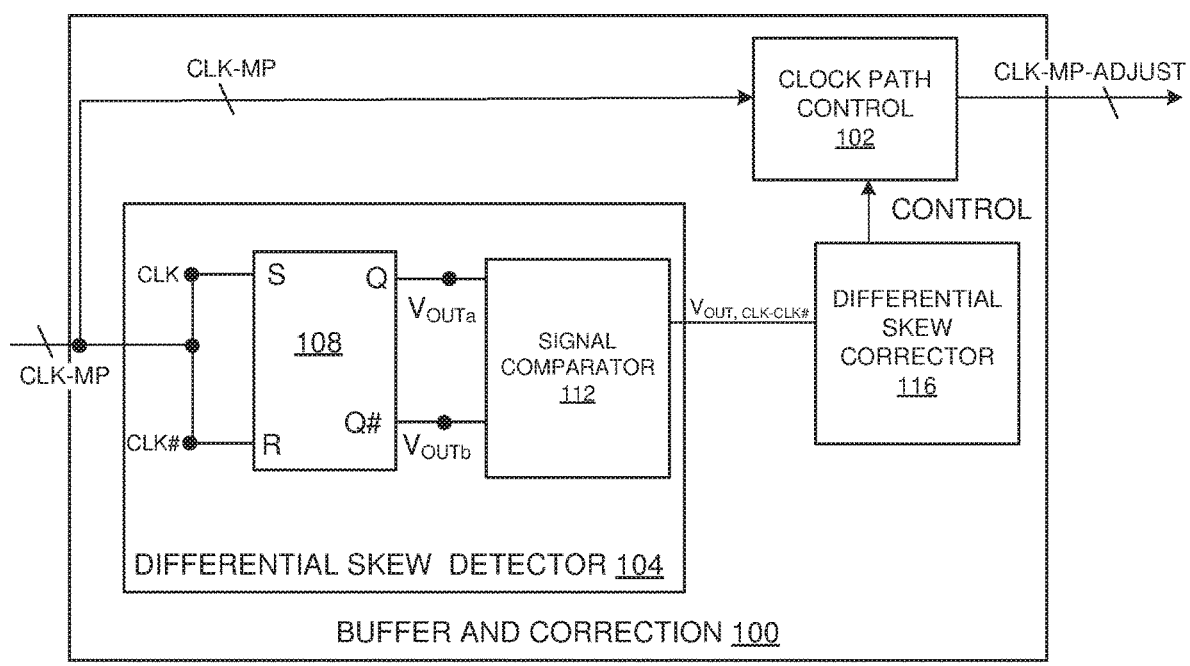
FIG. 1 illustrates a diagram of an example of a buffer and correction module with a differential skew detector for an IC chip.

This disclosure relates to modules for an integrated circuit IC chip. The modules can be employed in an intellectual property (IP) block of an IC chip design or a fabricated IC chip. The modules for the IC chip can include a buffer and correction module that receives a four-phase clock signal set (e.g., multiple clock signals with different phases) at a given frequency (e.g., 2.5 Gigahertz (GHz) to about 14 GHz). The buffer and correction module can include a differential skew detector that detects a skew between differential clock signals of a set of multiphase clock signals, including the four-phase clock signal set. The differential skew detector can be formed with a first SR latch and a second SR latch. A first set of differential clock signals of the four-phase clock signal set are input into the first SR latch. A second set of differential clock signals of the four-phase clock signal set are input into the second SR latch. The first set of differential clock signals and the second set of differential clock signals of the four phase clock signal set are set to be 180 degrees out of phase. Clock signals in the first set of differential clock signals are 90 degrees out of phase with clock signals in the second set of differential clock signals.

The first SR latch is configured such that a direct current (DC) component of a first output signal and a DC component of a second of the first SR latch varies as a function of the skew between the first set of differential clock signals of the set of multiphase clock signals. Similarly, the second SR latch is configured such that a DC component of a first output signal and a DC component of a second output signal of the second SR latch varies as a function of the skew between the second set of differential clock signals of the set of multiphase clock signals.

The buffer and correction module can include a differential skew corrector, that controls a clock path control module (e.g., an array of logic gates) to adjust phases of the four-phase clock signal set to form an adjusted four-phase clock signal set. Thus, the buffer and correction module can curtail clock skew between the differential clock signals of the four-phase clock signal set to ensure that the differential clock signals are 180 degrees out of phase.

The buffer and correction module can also include components to corrects a duty cycle and a quadrature error of the four-phase clock signal set to form the adjusted four-phase clock signal set. In this manner, phases of the adjusted clock signal are 90 degrees out of phase and each clock phase has a 50% duty cycle.

In some examples, the buffer and correction module can be employed in a serializer, such as a two-stage serializer. In such a situation a first serializer stage can include a first multiplexer array that encodes a multichannel bitstream based on a four-phase clock signal set at a given frequency to generate a second multichannel bitstream. Additionally, the two-stage serializer can include a second serializer stage that includes a second plurality of multiplexers that encodes the second multichannel bitstream signal based on the adjusted four-phase clock signal set to generate a serialized data signal.

FIG. 1 illustrates a block diagram of a buffer and correction module 100 for an IC chip. Features of the buffer and correction module 100 can be stored on a non-transitory machine-readable medium (e.g., volatile or non-volatile random-access memory (RAM)). In such a situation, the buffer and correction module 100 can be employed by an IP block to design the IC chip with an electronic design automation (EDA) application executing on a computing platform. Alternatively, features of the buffer and correction module 100 can be embedded in a fabricated IC chip.

The buffer and correction module 100 can receive a set of multiphase clock signals, CLK-MP. A set of multiphase clock signals refers to multiple clock signals that are set to have the same frequency, wherein each signal within the set of multiphase clock signals is out of phase with the other clock signals within the set of multiphase clock signals. The set of multiphase clock signals, CLK-MP can be a two-phase clock signal set or a four-phase clock signal set. In the example illustrated, two phases of the set of multiphase clock signals, CLK-MP are illustrated, namely, a reference clock signal (phase 1), CLK and an inverted clock signal (phase 2), CLK #, of the set of multiphase clock signals, CLK-MP are set to be 180 degrees out of phase. That is, the reference clock signal, CLK and the inverted clock signal, CLK # are set to be complementary, and differential clock signals. Additionally, in the examples described herein, the reference clock signal, CLK and the inverted clock signal, CLK # are each set to have a duty cycle of 50%. However, in many situations clock skew between the reference clock signal, CLK and the inverted clock signal, CLK # cause intervals of time where both the reference clock signal, CLK and the inverted clock signal, CLK # are both asserted (e.g., at a high voltage state) or de-asserted (e.g., at a low voltage state).

The buffer and correction module 100 can include a clock path control module 102 that receives the set of multiphase clock signals, CLK-MP. The clock path control module 102 can include logic gates for adding or removing delay to phases of the set of multiphase clock signals, CLK-MP, including the reference clock signal, CLK and the inverted clock signal, CLK #.

The buffer and correction module 100 can include a differential skew detector 104 that receives the reference clock signal, CLK and the inverted clock signal, CLK # at inputs of a SR latch 108. The SR latch 108 can represent a set of SR latches (e.g., one or more SR latches). In examples where the set of multiphase clock signals is a four-phase clock signal set, the differential skew detector 104 can include two SR latches that each receive a set of differential clock signals of the four-phase clock signal set.

In the example illustrated, the reference clock signal, CLK is input into the set (labeled S) input of the SR latch 108 and the inverted clock signal, CLK # is input into the reset (labeled R) input of the SR latch 108. A first output, labeled Q of the SR latch 108 can provide a first output signal, $V_{OUTa}$. A second output, labeled Q # can provide a second output signal, $V_{OUTb}$.

Figure 2:
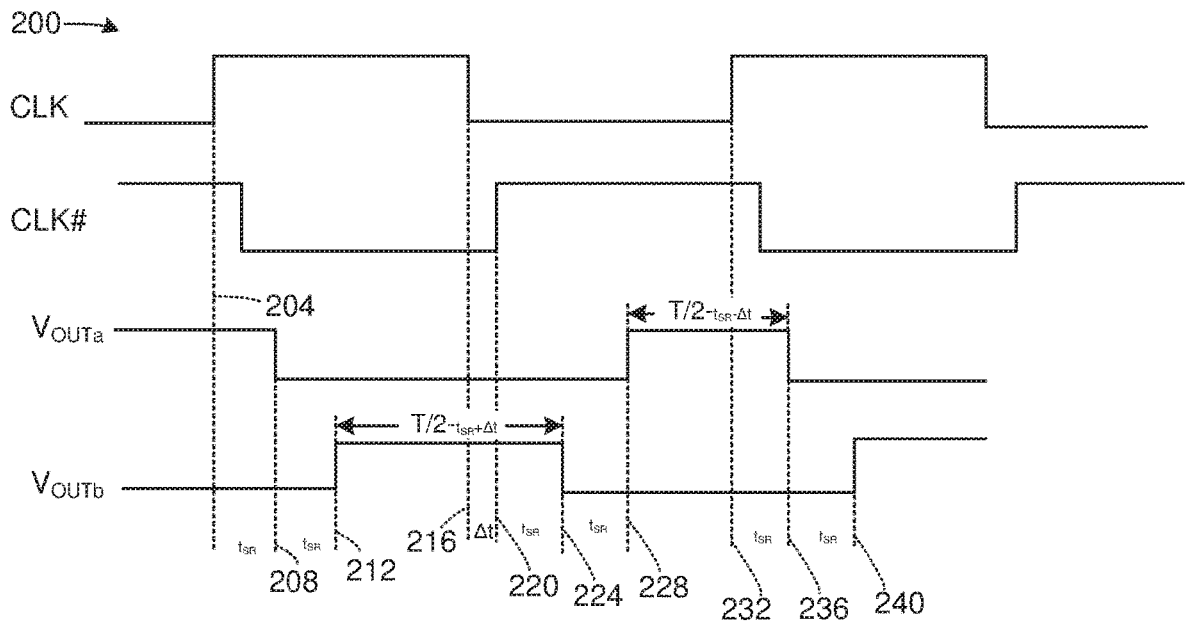
FIG. 2 illustrates a timing diagram for a differential skew detector.

FIG. 2 illustrates a timing diagram 200 that plots the input and the output of the SR latch 108 of FIG. 1. In particular, the timing diagram includes lines characterizing the reference clock signal, CLK and the inverted clock signal, CLK # of FIG. 1. Additionally, the timing diagram 200 includes plots for the first output, $V_{OUTa}$ and the second output signal, $V_{OUTb}$ of the SR latch 108 of FIG. 1. For purposes of simplification of explanation, each of the reference clock signal, CLK and the inverted clock signal, CLK #, the first output signal, $V_{OUTa}$ and the second output signal, $V_{OUTb}$ are output on the same timeline.

In the timing diagram 200, a first falling edge 204 of the reference clock signal, CLK induces a first falling edge 208 at the first output signal, $V_{OUTa}$. Additionally, the first falling edge of the first output signal, $V_{OUTa}$ causes a first rising edge 212 of the second output signal, $V_{OUTb}$. The time interval between the first falling edge 204 of the reference clock signal, CLK and the first falling edge 208 of the first output signal, $V_{OUTa}$ as well as the time interval between the first falling edge 208 of the first output signal, $V_{OUTa}$ is referred to as an SR latch delay, labeled $t_{SR}$ in the timing diagram 200. The SR latch delay, $t_{SR}$ is induced by a delay of internal components (e.g., logic gates, transistors, traces, etc.) of the SR latch 108 of FIG. 1.

Additionally, a first falling edge 216 of the reference clock signal, CLK induces a first rising edge 220 of the inverted clock signal, CLK #. The time interval between the first falling edge 216 of the reference clock signal, CLK and the first rising edge 220 of the inverted clock signal, CLK # defines a skew, Δt between the reference clock signal, CLK and the inverted clock signal, CLK #. Because of the skew, Δt between the reference clock signal, CLK and the inverted clock signal, CLK #, the SR latch 108 of FIG. 1 will be in an illegal or restricted state when both the reference clock signal, CLK and the inverted clock signal, CLK # (a set of differential clock signals) are both asserted (e.g., high state).

Furthermore, the first rising edge 220 of the inverted clock signal, CLK #, causes a first falling edge 224 of the second output signal, $V_{OUTb}$. The time interval between the first rising edge of the inverted clock signal, CLK # and the first falling edge 224 of the second output signal, $V_{OUTb}$ is the SR latch delay, $t_{SR}$. Furthermore, after another SR latch delay, $t_{SR}$, the first output signal, $V_{OUTa}$ has a first rising edge 228. Additionally, a second rising edge 232 of the reference clock signal, CLK causes a second falling edge 236 of the first output signal, $V_{OUTa}$, after another SR latch delay, $t_{SR}$. The second falling edge 236 of the first output signal, $V_{OUTa}$ causes a second rising edge 240 of the second output voltage, signal, $V_{OUTb}$ after another SR latch delay, $t_{SR}$.

As illustrated, both the first output signal, $V_{OUTa}$ and the second output signal, $V_{OUTb}$ have a duty cycle that is less than 50%. More particularly, the first output signal, $V_{OUTa}$ has a pulse width defined by the time interval between the first rising edge 228 and the second falling edge 236 of the first output signal, $V_{OUTa}$. Equation 1 can be employed to define the pulse width, $PW_{VOUTa}$ for the first output signal, $V_{OUTa}$. Similarly, the second output signal, $V_{OUTb}$ has a pulse width defined by a time interval between the first rising edge 212 and the first falling edge 224 of the second output signal, $V_{OUTb}$. Equation 1 can be employed to define the pulse width, $PW_{VOUTa}$ for the first output signal, $V_{OUTa}$, and Equation 2 can be employed to define the pulse width $PW_{VOUTb}$ for the second output signal, $V_{OUTb}$.

$$PW_{VOUTa} = \frac{T}{2} - t_{SR} - \Delta t \qquad \text{Equation 1}$$

$$PW_{VOUTb} = \frac{T}{2} - t_{SR} + \Delta t \qquad \text{Equation 2}$$

Wherein:

T is the period for the first CLK and the second signal, CLK #; $t_{SR}$ is the SR latch delay;

Δt is the skew between the reference clock signal, CLK and the inverted clock signal, CLK #; and Δt<$t_{SR}$.

As demonstrated by Equations 1 and 2, the difference in the pulse width, $PW_{VOUTa}$ for the first output signal, $V_{OUTa}$, the pulse width $PW_{VOUTb}$ for the first output signal, $V_{OUTb}$ is equal to twice the skew, Δt between the reference clock signal, CLK and the inverted clock signal, CLK #. As frequency of the clock signal, CLK and the inverted clock signal, CLK # increase, such as to a range of about 2.5 GHz to about 14 GHz, the skew, Δt can be 500 femtoseconds (fs) or less. By employing the differential skew detector 104 of FIG. 1, the skew, Δt can be determined as a comparison of two other signals, thereby obviating the need to measure the skew, Δt directly (e.g., with gate logic comparing the reference clock signal, CLK and the inverted clock signal, CLK #).

Referring back to FIG. 1, the first output signal, $V_{OUTa}$ and the second output signal, $V_{OUTb}$ can be input into a signal comparator 112 that can determine a difference (in voltage) between the first output signal, $V_{OUTa}$ and the second output signal, $V_{OUTb}$. The signal comparator 112 can determine a direct current (DC) component (e.g., average value) of the first output signal, $VDC_{Vouta}$ and a DC component of the second output signal, $VDC_{Voutb}$. The signal comparator 112 can subtract the DC component of the second output signal, $VDC_{Voutb}$ from the DC component of the first output signal, $VDC_{VOUTa}$.

Figure 3:
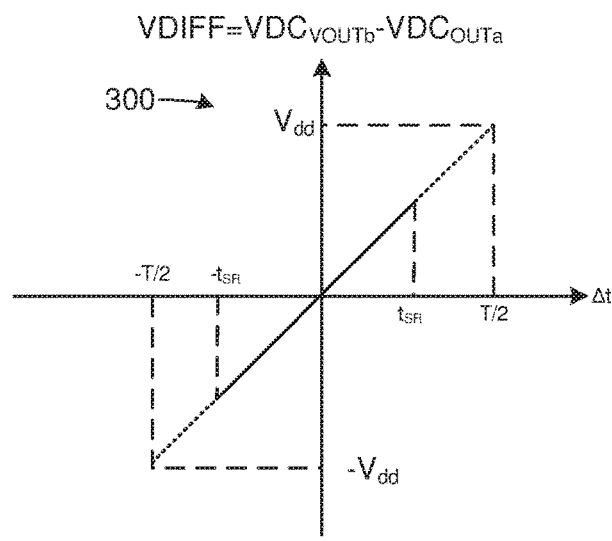
FIG. 3 illustrates a graph that plots a differential voltage as a function of clock skew.

FIG. 3 illustrates a graph 300 that plots a difference voltage, VDIFF for the SR latch 108 of FIG. 1 that characterizes the difference between the DC component of the second output signal, $VDC_{Voutb}$ and the DC component of the first output signal, $VDC_{VOUTa}$ as a function of a skew, Δt between the reference clock signal, CLK and the inverted clock signal, CLK #. As illustrated, the difference voltage, VDIFF is at least a voltage level that corresponds to the SR latch delay, $t_{SR}$ (e.g., for the skew, Δt=0). Additionally, the, the difference voltage, VDIFF has a maximum of a power terminal voltage, $V_{dd}$ for the SR latch 108 of FIG. 1, which would correspond to a maximum skew, Δt, where Δt≈T/2.

Referring back to FIG. 1, the signal comparator 112 can output a clock differential signal, $V_{OUT, CLK-CLK\#}$, a signal characterizing the difference voltage, VDIFF to a differential skew corrector 116. In some examples, the clock differential signal, $V_{OUT, CLK-CLK\#}$ can be a digital signal encoding data characterizing the skew between differential clock signals of the set of multiphase clock signals, CLK-MP, and in other examples, the clock differential signal, $V_{OUT, CLK-CLK\#}$ can be an analog signal. In response, the differential skew corrector 116 can generate a control signal, CONTROL that can be provided to the clock path control module 102. The clock path control module 102 can add or remove delay to the first clock signal CLK or the inverted clock signal, CLK # to curtail the skew, Δt and output an adjusted version of the set of multiphase clock signals, CLK-MP-ADJUST. The set of adjusted multiphase clock signals, CLK-MP-ADJUST has less skew, between differential phases than the set of multiphase clock signals, CLK-MP.

Figure 4:
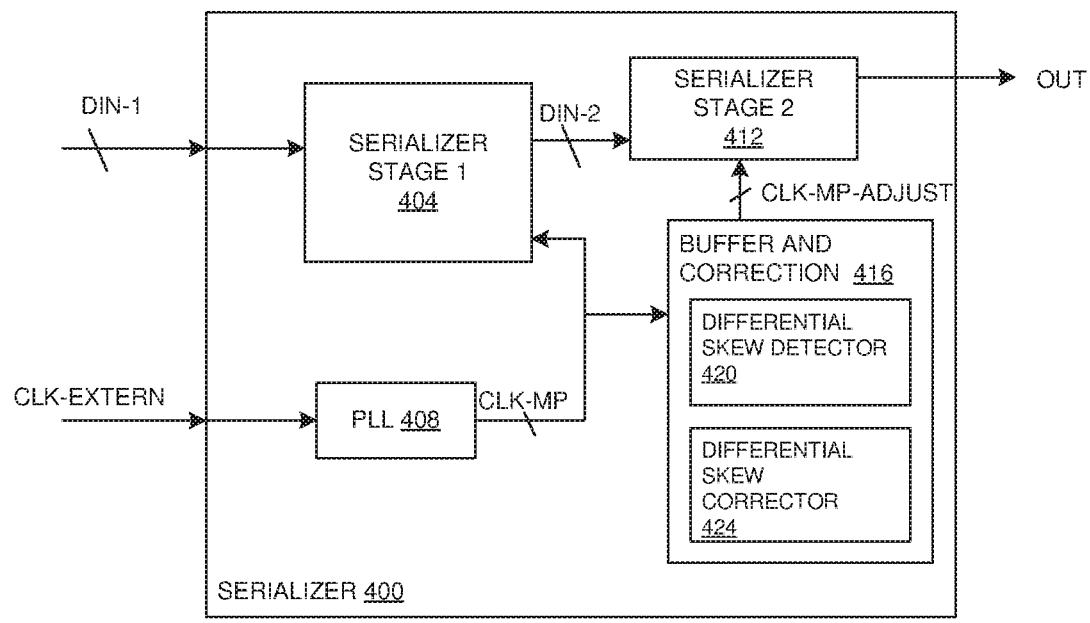
FIG. 4 illustrates a diagram of a serializer for an IC chip.

FIG. 4 illustrates an example of a serializer 400 that can be employed as an IC chip or a module (e.g., as an IP block) of an IC chip. Machine-readable instructions characterizing the serializer 400 can be stored on a non-transitory memory and accessed by an EDA application. Alternatively, the serializer 400 can be embedded in a fabricated IC chip.

The serializer 400 is illustrated and described as a multistage serializer However, in other examples, the serializer 400 can be implemented on a single stage serializer. The serializer 400 is configured to convert a multichannel (e.g., multi-line) bitstream, DIN-1 into a single ended or a double end serial data signal (e.g., a 1 channel data stream), OUT.

The multichannel bitstream, DIN-1 can be input into a first serializer stage 404 ("SERIALIZER STAGE 1") of the serializer 400. The multichannel bitstream can have M number of parallel channels, where M is an integer greater than or equal to four (4). In some examples, the multichannel bitstream, DIN-M can have thirty-two (32) parallel channels.

A phase locked loop (PLL) 408 can receive an external clock signal, CLK-EXTERN from another source (e.g., a clock generator). The PLL 408 can convert the external clock signal, CLK-EXTERN into a set of multiphase clock signals, CLK-MP. The set of multiphase clock signals, CLK-MP can be implemented as two or four-phase shifted clock signals with the same frequency. In some examples, the frequency of the set of multiphase clock signals, CLK-MP can be between about 2.5 GHz to about 14 GHz. The set of multiphase clock signals, CLK-MP can be provided to the first serializer stage 404. The first serializer stage 404 can include a plurality of multiplexers to encode the multichannel bitstream, DIN-1 to generate an intermediate multichannel bitstream, DIN-2. The intermediate multichannel bitstream, DIN-2 has fewer channels (e.g., at least one less channel) than the multichannel bitstream, DIN-1. The intermediate multichannel bitstream, DIN-1 can be provided to a second serializer stage 412 (labeled "SERIALIZER STAGE 2").

The set of multiphase clock signals, CLK-MP can also be provided to a buffer and correction module 416. The buffer and correction module 416 can be employed to implement the buffer and correction module 100 of FIG. 1. Thus, the buffer and correction module 416 can include a differential skew detector 420 that can detect a skew between phases of clock signals in the set of multiphase clock signals, CLK-MP. The differential skew detector 420 can be employed to implement the differential skew detector 104 of FIG. 1. The buffer and correction module 416 can also include a differential skew corrector 424 that can be employed to implement the differential skew corrector 116 of FIG. 1. Thus, the buffer and correction module 416 can adjust the set of multiphase clock signals, CLK-MP to output an adjusted set of multiphase clock signals, CLK-MP-ADJUST to the second serializer stage 412.

The second serializer stage 412 can employ a multiplexer or multiple multiplexers to convert the intermediate multichannel bitstream, DIN-2 into a single channel bitstream, OUT that is output on a single channel. In some examples, the single channel bitstream, OUT can be provided as a differential signal (e.g., a double-ended output signal). In other examples, the single channel bitstream, OUT can be output as a single ended signal. By curtailing the skew in the set of multiphase clock signals, CLK-MP, bit lengths in the single channel bitstream, OUT are more consistent, thereby reducing error and increasing bandwidth of the serializer 400.

Figure 5:
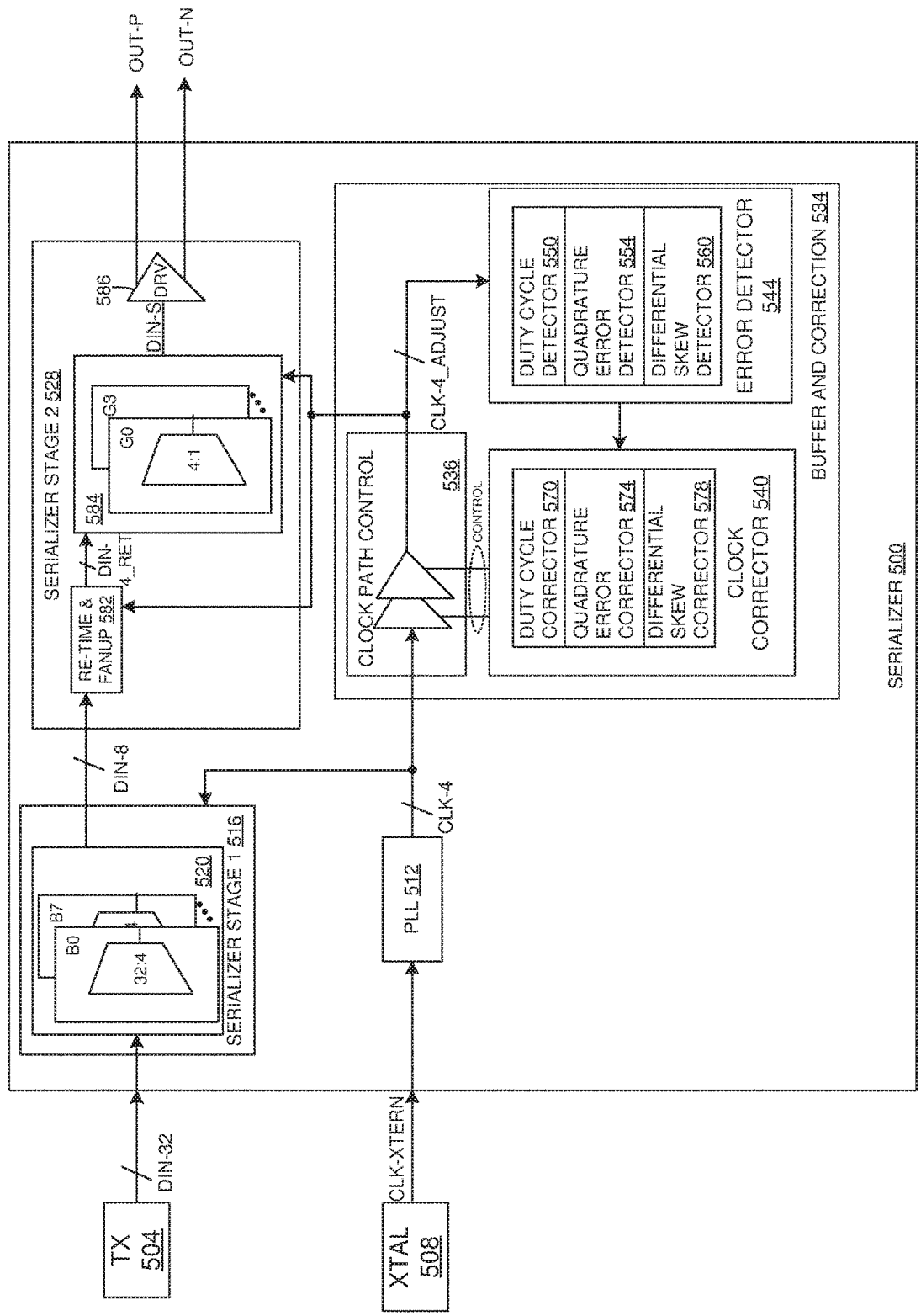
FIG. 5 illustrates another diagram of a serializer for an IC chip.

FIG. 5 illustrates another example of a serializer 500 that can be employed as an IC chip or a module (e.g., as an IP block) of an IC chip. The serializer 500 can be employed to implement the serializer 400 of FIG. 4. Machine-readable instructions characterizing the serializer 500 can be stored on a non-transitory memory and accessed by an EDA application. Alternatively, the serializer 500 can be embedded in a fabricated IC chip.

The serializer 500 is illustrated and described as a two-stage serializer 500 that serializes a 32-channel (e.g., 32 line) bitstream, DIN-32. In some examples, the serializer 500 can be employed for level 4 pulse amplitude modulation (PAM-4) for Gigabit Ethernet communications (e.g., 1000 Gb/s or more). The 32 channel bitstream, DIN-32 can be provided to the serializer 500 from a transmitter 504. The serializer 500 can include a PLL 512 that receives an external (e.g., global) clock signal, CLK-XTERN from a crystal (XTAL) 508. In other examples, the reference clock signal, CLK can be provided from another source. The external clock signal, CLK-XTERN can have a frequency that ranges from about 2.5 GHz to about 14 GHz. In some examples, the transmitter 504 can set each channel in the 32 channel bitstream, DIN-32 to a frequency that is a fraction of the clock signal, CLK. Thus, in such a situation, the external clock signal, CLK-XTERN can be provided to the transmitter 504 for reference.

The PLL 512 can generate a four-phase clock signal set, CLK-4, wherein each of the four-phases has the same frequency as the external clock signal, CLK-EXTERN. Each of the four-phases are set by the PLL 512 to be 90 degrees out of phase. More particularly, the four-phase clock signal set can have a reference clock signal, CLK-4_0 that is in-phase with the external clock signal, CLK-EXTERN. The four-phase clock signal set can have a 90 degree clock signal, CLK-4_90 that has a 90 degree phase shift with respect to the reference clock signal, CLK-4_0. The four-phase clock signal set can have a 180 degree clock signal, CLK-4_180 that has a 180 degree phase shift with respect to the reference clock signal, CLK-4_0. The four-phase clock signal set can further have a 270 degree clock signal, CLK-4_270 that has a 270 degree phase shift with respect to the reference clock signal, CLK-4_0.

The serializer 500 is implemented as a two-stage serializer. The serializer is configured to convert the 32, DIN-32 into a double-ended serial data signal (e.g., a 1 channel data stream), OUT-P and OUT-N.

The 32 channel bitstream, DIN-32 can be input into a first serializer stage 516 ("SERIALIZER STAGE 1") of the serializer 500. Additionally, the PLL 512 can provide the set of multiphase clock signals, CLK-4 to the first serializer stage 516. The 32 channel bitstream DIN-32 has thirty-two parallel channels (32 lines). The first serializer stage 516 includes an array of multiplexers 520. In the example illustrated, there are 8 multiplexers in the 520 labeled B0-B7. Each multiplexer in the array of multiplexers 520 can be a 32:4 multiplexer that can serialize 4 of the 32 bits based on the four-phase clock signal set, CLK-4. Thus, the array of multiplexers 520 can generate an 8 channel bitstream, DIN-8 that is provided to a second serializer stage 528 ("SERIALIZER STAGE 2").

The set of multiphase clock signals, CLK-4 can also be provided to a buffer and correction module 534. The buffer and correction module 534 can be employed to implement the buffer and correction module 100 of FIG. 1. The buffer and correction module 534 can include a clock path control module 536. The clock path control module 536 can be formed with an array of buffers and/or logic gates (e.g., inverters) that can add or remove delay to individual phases of the set of multiphase clock signals. More particularly, a clock corrector 540 of the buffer and correction module 534 can generate a control signal, CONTROL that is provided to the clock path control module 536.

Figure 6:
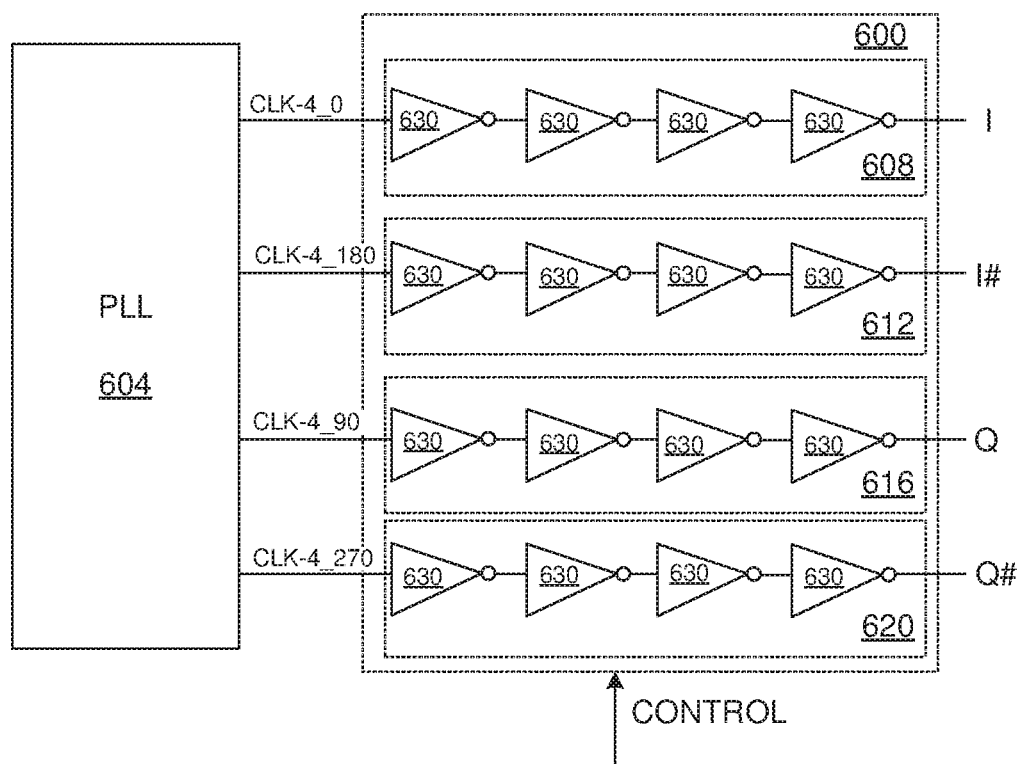
FIG. 6 illustrates a simplified example of a clock path control module.

FIG. 6 illustrates a simplified example of a clock path control module 600 that is employable as the clock path control module 536 of FIG. 5. The clock path control module 600 includes four input lines, wherein each line receives a phase of a four-phase clock signal set provided from a PLL 604, (e.g., the PLL 512 of FIG. 5). A first clock path 608 can receive a reference phase of the clock signal, CLK-4_0 and output and in-phase clock signal, I. A second clock path 612 can receive a 180 degree phase shifted phase of the clock signal, CLK-4_180 and output an inverted in-phase clock signal, I #. A third clock path 616 can receive a 90 degree shifted phase of the clock signal, CLK-4_90 and can output a quadrature clock signal, Q. A fourth clock path 620 can receive a 270 degree shifted phase of the clock signal, CLK-4_270 and can output an inverted clock signal Q #.

The first clock path 608, the second clock path 612, the third clock path 616 and the fourth clock path 620 can each include four inverters 630 connected in series. In other examples, there could be more or less inverters 630 (or other logic gates) included. A control signal, CONTROL provided from a clock corrector (e.g., the clock corrector 540 can control operations of the inverters 630 to selectively activate or deactivate the inverters 630 to add or remove delay to the phases of the clock signal, CLK-4 to form the in-phase clock signal, I, the inverted in-phase clock signal, I #, the quadrature clock signal, Q and the inverted quadrature signal, Q #.

Referring back to FIG. 5, the clock path control module 536 outputs an adjusted version of the four-phase clock signal set, CLK-4_ADJUST. As demonstrated in FIG. 6, the adjusted four-phase clock signal set, CLK-4_ADJUST can have four-phases, namely, an in-phase clock signal, I, an inverted in-phase clock signal, I #, a quadrature clock signal, Q and an inverted quadrature signal, Q #. The in-phase clock signal, I and the inverted in-phase clock signal I # are set to be 180 degrees out of phase. The quadrature clock signal, Q and the inverted quadrature clock signal, Q # are set to be 180 degrees out of phase, and 90 degrees out of phase with the in-phase clock signal, I and the inverted in-phase clock signal I #.

The adjusted clock signal, CLK-4_ADJUST is provided to the second serializer stage 528 and to an error detector 544. The error detector 544 can detect errors in the adjusted clock signal, CLK-4_ADJUST, and generate a feedback signal for the clock corrector 540. In response, the clock corrector 540 can adjust the control signal, CONTROL to tune the adjusted clock signal, CLK-4_ADJUST. The feedback signal can be an aggregate signal characterizing errors detected by components of the error detector 544.

The error detector 544 can include a duty cycle detector 550. The duty cycle detector 550 module can measure a duty cycle of each phase in the adjusted clock signal, CLK-4_ADJUST to determine if any (or all) of the phases of the adjusted clock signal, CLK-4_ADJUST have a duty cycle that is greater than or less than 50%. The duty cycle detector 550 can encode data in the feedback signal characterizing a duty cycle of each of the four-phases of the adjusted clock signal set, CLK-4_ADJUST.

The error detector 544 can include a quadrature error detector 554. The quadrature error detector 554 can measure quadrature error between clock signal phases that are set to be 90 degrees out of phase in the adjusted clock signal, CLK-4_ADJUST to determine if any (or all) of the phases of the adjusted clock signal, CLK-4_ADJUST need adjusted. The error detector 544 can encode data in the feedback signal characterizing a quadrature error in each of the four-phases of the adjusted clock signal set, CLK-4_ADJUST, or some subset thereof.

Figure 7A:
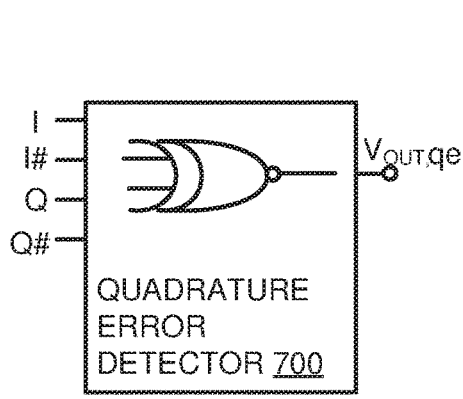
FIG. 7A illustrates a diagram of a quadrature error detector.

FIG. 7A illustrates an example of a quadrature error detector 700 that is employable to implement the quadrature error detector 554 of FIG. 5. The quadrature error detector 700 receives four-phases of a four-phase clock signal set, such as the adjusted signal, CLK-4_ADJSUT of FIG. 5. More particularly, the quadrature error detector 700 can receive an in-phase signal, I an inverted in-phase signal, I #, quadrature signal, Q and an inverted quadrature signal, Q #. In response, the quadrature error detector 700 outputs an output signal characterizing a quadrature error, $V_{OUT,qe}$. To determine detected quadrature error, $V_{OUT,qe}$, the quadrature error detector 700 executes exclusive-OR (XOR) operations on the phases of the four-phase clock signal set.

Figure 7C:
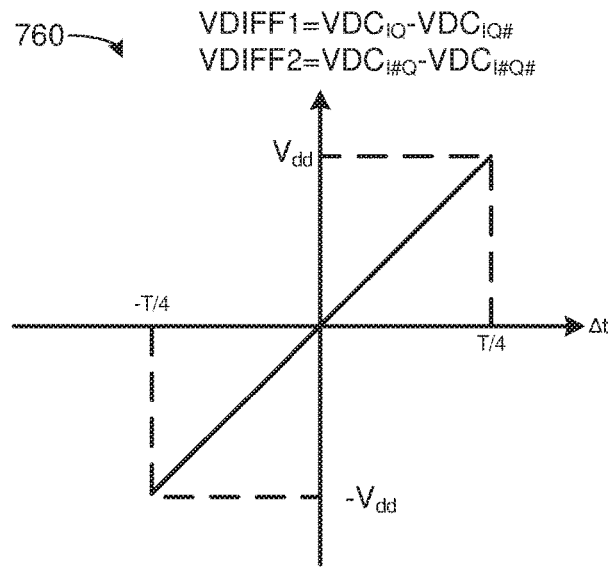
FIG. 7C illustrates a graph that plots a difference voltage as a function of quadrature error.
Figure 7B:
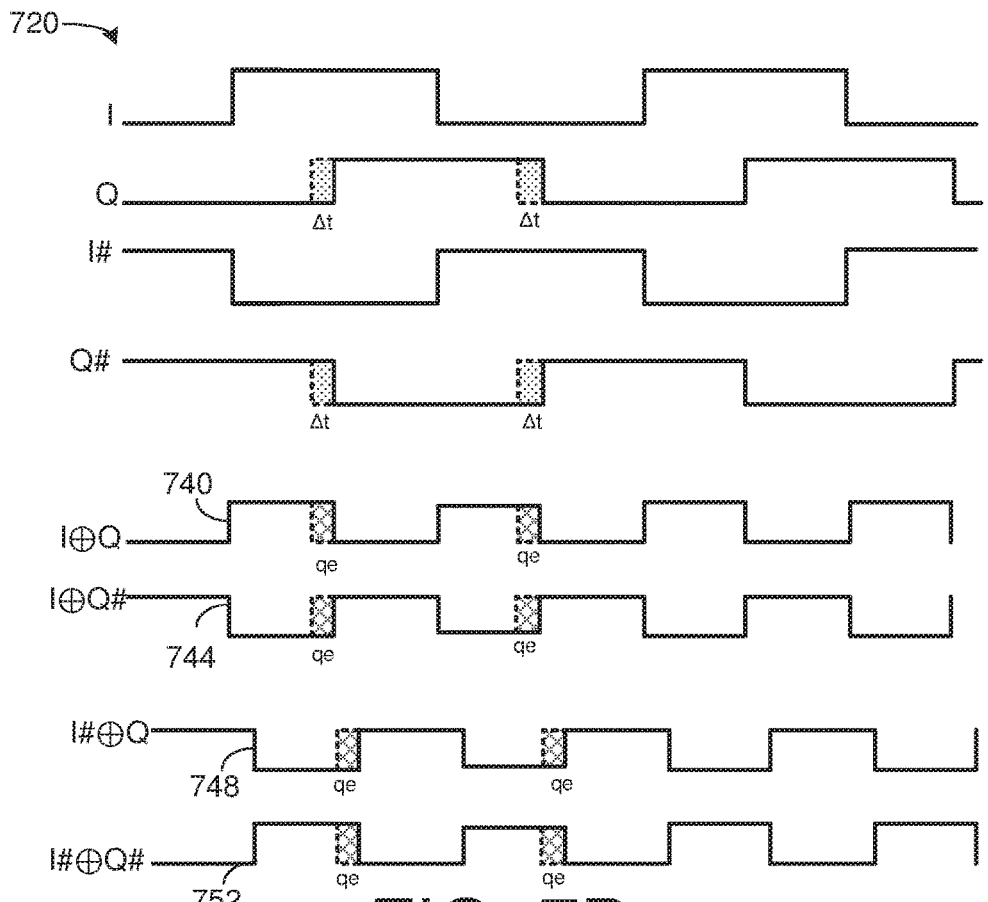
FIG. 7B illustrates a timing diagram for signals processed by the quadrature error detector of FIG. 7A.

FIG. 7B illustrates a timing diagram 720 that plots the in-phase signal, I, the quadrature signal, Q, the inverted in-phase signal, I # and the inverted quadrature signal, Q # as a function of time. The quadrature signal, Q and the inverted quadrature signal, Q # are set to be 90 degrees out of phase with the in-phase signal, I and the inverted in-phase signal, I #. However, as illustrated, during time intervals of a quadrature error, Δt, the quadrature signal, Q and the inverted quadrature signal, Q # are out of phase with the in-phase signal, I and the inverted in-phase signal, I #.

As noted, the quadrature error detector 700 executes XOR operations on the phases of the four-phase clock signal set to determine the quadrature error, $V_{OUT,qe}$. The timing diagram 720 also include four XOR plots. A first XOR plot 740 plots the XOR comparison of the in-phase signal, I and the quadrature signal. A second XOR plot 744 plots the XOR comparison of the in-phase signal, I and the inverted quadrature signal, Q #. A third XOR plot 748 plots the XOR comparison of the inverted in-phase signal, I # with the quadrature signal, Q. A fourth XOR plot 752 plots the XOR comparison of the inverted in-phase signal, I # with the inverted quadrature signal, Q #.

The quadrature error detector 700 can measure a DC component of each of the four XOR plots 740, 744, 748 and 752. In the four XOR plots, 740, 744, 748 and 752, intervals of the quadrature error, Δt, induce a gain in the DC components, qe corresponding to the quadrature error, Δt. Additionally, the quadrature error detector 700 can subtract the DC component of the XOR operation for the second XOR plot 744, $VDC_{IQ\#}$ from the DC component of the XOR operation for the first XOR plot 740, $VDC_{IQ}$ to determine a first differential voltage, VDIFF1. Similarly, the quadrature error detector 700 can subtract the DC component of the XOR operation for the fourth XOR plot 752, $VDC_{I\#Q\#}$ from the DC component of the XOR operation for the third XOR plot 748, $VDC_{I\#Q}$ to determine a second differential voltage, VDIFF2. In situations where there is 0 skew between the differential clock signals that are 180 degrees out of phase (e.g., the in-phase signal, I and the inverted in-phase signal, I # as well as the quadrature signal, Q and the inverted quadrature signal, Q #), the first difference signal VDIFF1 and the second difference signal, VDIFF2 are equal.

FIG. 7C illustrates a graph 760 that plots quadrature error, the first differential voltage, VDIFF1 and/or the second differential voltage, VDIFF2 as a function of the quadrature error Δt. As illustrated, the maximum quadrature error is one-fourth (¼) of a period T, of the four-phase clock signal set, labeled as T/4. At a quadrature error of T/4 or −T/4, the first differential voltage, VDIFF1 and/or the second differential voltage, VDIFF2 are equal to about a power terminal voltage, $V_{dd}$ or $-V_{dd}$ for the quadrature error detector 700. Thus, as the quadrature error, Δt is reduced, the first difference voltage, VDIFF1 and/or the second difference voltage, VDIFF2 are also reduced. The output signal, $V_{OUT,qe}$ can characterize a combination of the first and second differential voltages, VDIFF1 and VDIFF2.

As illustrated operations of the quadrature error detector 700 are dependent upon the differential clock signals that are 180 degrees out of phase (e.g., the in-phase signal, I and the inverted in-phase signal, I # as well as the quadrature signal, Q and the inverted quadrature signal, Q #), having a skew that is near or at 0. As the skew between the differential clock signals increases, accuracy of the quadrature error detector 700 decreases.

Referring back to FIG. 5, to ensure that the differential clock signals of the adjusted four-phase clock signal set, CLK-4_ADJUST have a skew that is 0 or nearly 0 (e.g., within 50 femtoseconds), the error detector 544 can include a differential skew detector 560. The differential skew detector 560 module can measure skew between differential clock signals 180 degrees out of phase in the adjusted clock signal four-phase clock signal set, CLK-4_ADJUST to determine if any (or all) of the phases of the four-phase adjusted clock signal set, CLK-4_ADJUST need adjusted. The error detector 544 can encode data in the feedback signal characterizing a differential skew for each set of differential clock signals of the four-phases of the four-phase adjusted clock signal set, CLK-4_ADJUST.

Figure 8A:
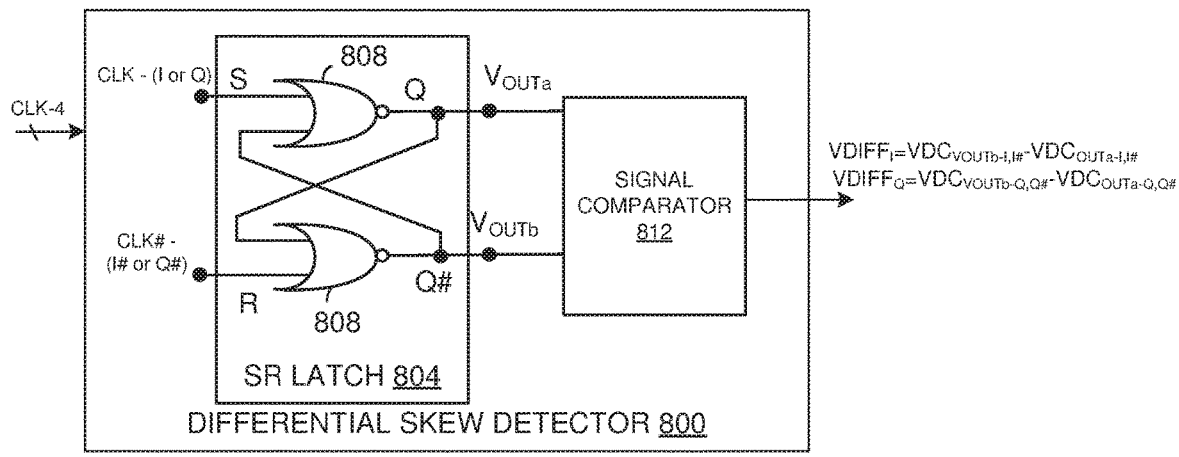
FIG. 8A illustrates a diagram of a differential skew detector.

In some examples, the differential skew detector 560 can be implemented in a manner similar to the differential skew detector 104 of FIG. 1. FIG. 8A illustrates a first example of a differential skew detector 800. The differential skew detector 800 can be employed to implement the differential skew detector 560 of FIG. 1. In the example illustrated, the differential skew detector 800 receives a four-phase clock signal set, CLK-4, such as the adjusted four-phase clock signal set, CLK-4_ADJUST of FIG. 5. Thus, the phases of the clock signal include, an in-phase signal, I, an inverted in-phase signal, I #, a quadrature signal, Q and an inverted quadrature signal, Q #. The SR latch 804 is representative of two separate SR latches that operate in the same manner. For purposes of simplification of explanation, only the operations of one SR latch 804 is illustrated and described. The SR latch 804 is formed of with a pair of NOR gates 808 arranged in the manner illustrated.

Each SR latch 804 receives a set of differential clock signals of the four-phase clock signal set, CLK-4 which differential clock signals can be a reference clock signal, CLK and an inverted clock signal, CLK #. The reference clock signal, CLK and the inverted clock signal, CLK # are set to be 180 degrees out of phase. Thus, a first instance of the SR latch 804 can receive an in-phase clock signal, I (CLK) and an inverted in-phase clock signal, I # (CLK #). Contemporaneously, a second instance of the SR latch 804 can receive an in-phase clock signal, Q (CLK) and an inverted in-phase clock signal, Q # (CLK #).

In the example illustrated, the reference clock signal, CLK is input into the set (labeled S) input of the SR latch 108 and the inverted clock signal, CLK # is input into the reset (labeled R) input of the SR latch 804. A first output, labeled Q of the SR latch 804 can provide a first output signal, $V_{OUTa}$. A second output, labeled, Q # can provide a second output signal, $V_{OUTb}$.

Figure 8B:
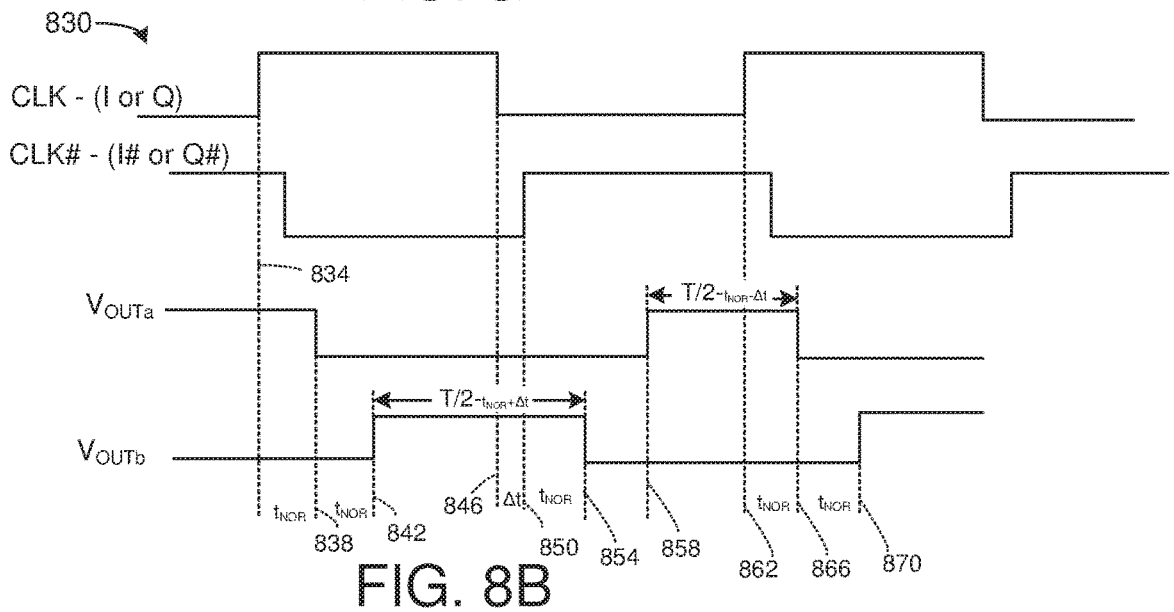
FIG. 8B illustrates a timing diagram for signals processed by the differential skew detector of FIG. 8A.

FIG. 8B illustrates a timing diagram 830 that plots the input and the output of the SR latch 108 of FIG. 1. In particular, the timing diagram includes lines characterizing the clock signal, CLK, which could be the in-phase signal, I or the quadrature signal, Q, and the inverted clock signal, CLK #, which could be the inverted quadrature clock signal, Q or the inverted in-phase signal, I #. Additionally, the timing diagram 830 includes plots for the first output, $V_{OUTa}$ and the second output signal, $V_{OUTb}$ of the SR latch 804. For purposes of simplification of explanation, each of the first signal, CLK and the inverted clock signal, CLK #, the first output, $V_{OUTa}$ and the second output signal, $V_{OUTb}$ are output on the same timeline.

In the timing diagram 830, a first rising edge 834 of the reference clock signal, CLK induces a first falling edge 838 at the first output signal, $V_{OUTa}$. Additionally, the first falling edge 838 of the first output signal, $V_{OUTa}$ causes a first rising edge 842 of the second output signal, $V_{OUTb}$. The time interval between the first falling edge 838 of the inverted clock signal, CLK # and the first rising edge 834 of the reference clock signal, CLK and the time interval between the first falling edge 838 of the inverted clock signal, CLK # and the first rising edge 842 of the first output signal, $V_{OUTa}$ is referred to as an NOR gate delay, labeled $t_{NOR}$ in the timing diagram 830. The SR latch delay, $t_{SR}$ is induced by a delay of the NOR gates 808 of the SR latch 804.

Additionally, a first falling edge 846 of the reference clock signal, CLK induces a first rising edge 850 of the inverted clock signal, CLK #. The time interval between the first falling edge 846 of the reference clock signal, CLK and the first rising edge 850 of the inverted clock signal, CLK # defines a skew, Δt between the reference clock signal, CLK and the inverted clock signal, CLK #. Because of the skew, Δt between the reference clock signal, CLK and the inverted clock signal, CLK #, the SR latch 804 is in an illegal or restricted state in situations when both the reference clock signal, CLK and the inverted clock signal, CLK # (a set of differential clock signals) are both asserted (e.g., high state).

Furthermore, the first rising edge 850 of the inverted clock signal, CLK #, causes a first falling edge 854 of the second output signal, VOUTb. The time interval between the first rising edge 850 of the inverted clock signal, CLK # and the first falling edge 854 of the second output signal, VOUTb is the NOR gate delay, $t_{NOR}$. Furthermore, after another NOR gate delay, $t_{NOR}$, the first output signal, VOUTa has a second rising edge 858. Additionally, a second rising edge 862 of the reference clock signal, CLK causes a second falling edge 866 of the first output signal, VOUTa, after another NOR gate delay, $t_{NOR}$. The second falling edge 866 of the first output signal, VOUTa causes a second rising edge 870 of the second output voltage, signal, VOUTb after another SR latch delay, $t_{SR}$.

As illustrated, both the first output signal, VOUTa and the second output signal, VOUTb have a duty cycle that is less than 50%. More particularly, the first output signal, VOUTa has a pulse width defined by the time interval between the first rising edge 858 and the second falling edge 866 of the first output signal, VOUTa. Similarly, the second output signal, VOUTb has a pulse width defined by a time interval between the first rising edge 842 and the first falling edge 854 of the second output signal, VOUTb. Equation 3 can be employed to define the pulse width, $PW_{VOUTa}$ for the first output signal, VOUTa, and Equation 4 can be employed to define the pulse width $PW_{VOUTb}$ for the first output signal, VOUTb.

$$PW_{VOUTa} = \frac{T}{2} - t_{NOR} - \Delta t \qquad \text{Equation 3}$$

$$PW_{VOUTb} = \frac{T}{2} - t_{NOR} + \Delta t \qquad \text{Equation 4}$$

Wherein:
T is the period for the CLK and the inverted second signal, CLK #;
$t_{NOR}$ is the NOR delay;
Δt is the skew between the reference clock signal, CLK and the inverted clock signal, CLK #; and
$\Delta t < t_{NOR}$.

As demonstrated by Equations 3 and 4, the difference in the pulse width, $PW_{VOUTa}$ for the first output signal, VOUTa, the pulse width $PW_{VOUTb}$ for the first output signal, VOUTb is equal to twice the skew, Δt between the reference clock signal, CLK (I or Q) and the inverted clock signal, CLK # (I # or Q #). As frequency of the reference clock signal, CLK and the inverted clock signal, CLK # increase, such as to a range of about 2.5 GHz to about 14 GHz, the skew, Δt can be 500 fs or less, which can be difficult to measure directly (e.g., with logical gates). Thus, by employing the differential skew detector 800, the skew, Δt can be determined indirectly (e.g., through logical subtraction).

In FIG. 8A, the first output signal, $V_{OUTa}$ and the second output signal, $V_{OUTb}$ can be input into a signal comparator 812 that can determine a difference (in voltage) between the first output signal, VOUTa and the second output signal, VOUTb. The signal comparator 812 can determine a DC component (e.g., average value) of the first output signal and the second output signal, for the in-phase signal, I and the inverted in-phase signal, I #, which DC component voltages can be referred to as a first in-phase DC signal, $VDC_{VOUTa-I,I\#}$ and a second in-phase DC signal, $VDC_{VOUTb-I,I\#}$. Similarly, the signal comparator 812 can determine a DC component (e.g., average value) of the first output signal and the second output signal, for the quadrature signal, Q and the inverted quadrature signal, Q #, which DC component voltages can be referred to as a first quadrature voltage DC signal, $VDC_{VOUTa-Q,Q\#}$ and a second quadrature DC signal, $VDC_{VOUTb-Q,Q\#}$.

The signal comparator 112 can determine an in-phase difference voltage, $VDIFF_I$ by subtracting the second in-phase DC signal, $VDC_{VOUTb-I,I\#}$ from the DC component of the first in-phase voltage output signal, $VDC_{VOUTa-I,I\#}$. The signal comparator 112 can also determine a quadrature difference voltage, $VDIFF_Q$ by subtracting the second quadrature DC signal, $VDC_{VOUTb-Q,Q\#}$ from the first quadrature DC signal, $VDC_{VOUTa-Q,Q\#}$.

Figure 8C:
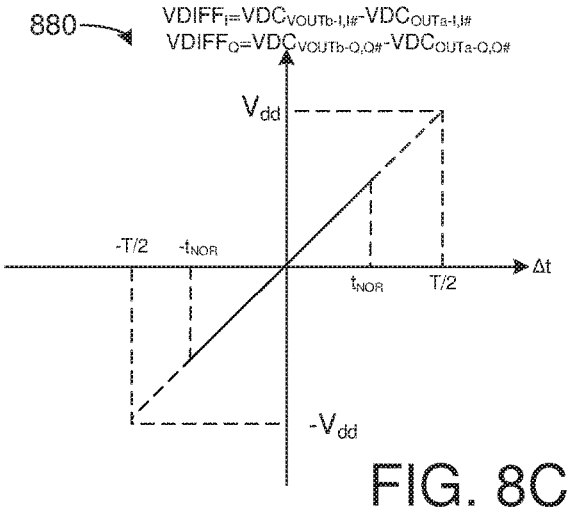
FIG. 8C illustrates a graph that plots a difference voltage as a function of clock skew.

FIG. 8C illustrates a graph 880 that plots the in-phase difference voltage, $VDIFF_I$ and the quadrature difference voltage, $VDIFF_Q$ for the SR latch 804 as a function of a skew, Δt between the reference clock signal, CLK (I or Q) and the inverted clock signal, CLK # (I # or Q #). As illustrated, the in-phase difference voltage, $VDIFF_I$ and the quadrature difference voltage, $VDIFF_Q$ are at least a voltage level that corresponds to the NOR gate delay, $t_{NOR}$ (e.g., for the skew, Δt=0). Additionally, the difference voltage, VDIFF has a maximum of a power terminal voltage, $V_{dd}$ for the SR latch, which would correspond to a maximum skew, Δt, where Δt≈T/2. A combination of the in-phase difference voltage, $VDIFF_I$ and the quadrature difference voltage, $VDIFF_Q$ can be referred to as a difference error (e.g., skew) between differential clock signals in the four-phase clock signal set, CLK-4. Thus, the in-phase difference voltage, $VDIFF_I$ and the quadrature difference voltage, $VDIFF_Q$ can be provided to another component for analysis.

Figure 9A:
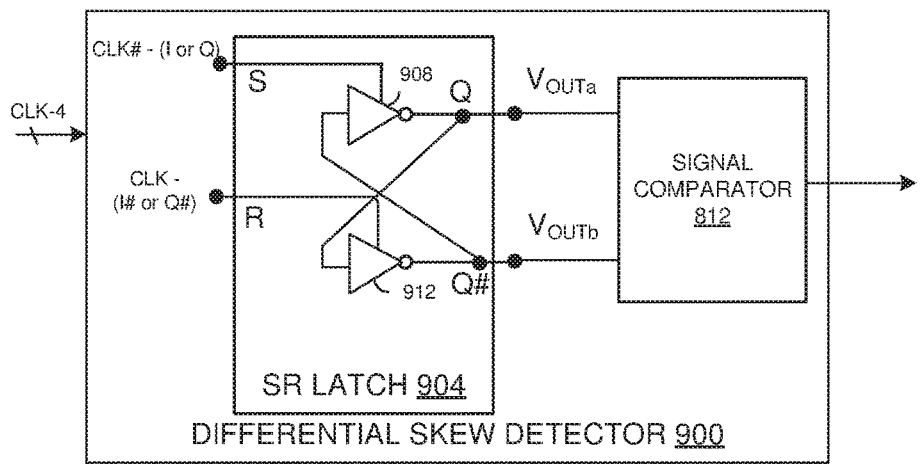
FIG. 9A illustrates a diagram of another example of a differential skew detector.

FIG. 9A illustrates a second example of a differential skew detector 900 that can be employed to implement the differential skew detector 560 of FIG. 5. For purposes of simplification of explanation, the same reference numbers and signal labels are employed in FIGS. 800 and 900 to denote the same structure and functions. Moreover, some such instances of structure and/or signals are not re-introduced. In the example illustrated, the differential skew detector 900 receives a four-phase clock signal set, CLK-4, such as the adjusted four-phase clock signal set, CLK-4_ADJUST of FIG. 5. Thus, the phases of the clock signal include, an in-phase signal, I, an inverted in-phase signal, I #, a quadrature signal, Q and an inverted quadrature signal, Q #. The SR latch 904 is representative of two separate SR latches that operate in the same manner. For purposes of simplification of explanation, only the operations of one SR latch 904 is illustrated and described.

The SR latch 904 is formed with a first inverter 908 and a second inverter 912 (NOT gates) arranged in the manner illustrated. More particularly, an output of the first inverter 908 provides a non-inverted output Q for the SR latch 904 and a first output signal, $V_{OUTa}$. The output of the first inverter 908 is coupled to an input of the second inverter 912. An output of the second inverter 912 provides an inverter output, Q # and a second output signal, $V_{OUTb}$. The output of the second inverter 912 is also provided to an input of the first inverter 908. Inputs to the SR latch 904, CLK and CLK # are connected to power terminals of the first inverter 908 and the second inverter 912, respectively and are used as S and R inputs of the SR latch 904.

Each SR latch 904 receives a pair of differential clock signals of the four-phase clock signal set, which differential clock signals can be a reference clock signal, CLK and an inverted clock signal, CLK #. The reference clock signal, CLK and the inverted clock signal, CLK # are set to be 180 degrees out of phase. Thus, a first instance of the SR latch 904 can receive an in-phase clock signal, I (CLK) and an inverted in-phase clock signal, I # (CLK #). Contemporaneously, a second instance of the SR latch 904 can receive an in-phase clock signal, Q (CLK) and an inverted in-phase clock signal, Q # (CLK #).

In the example illustrated, the inverted reference clock signal, CLK is input into the set (labeled S) input of the SR latch 904 and the reference clock signal, CLK is input into the reset (labeled R) input of the SR latch 904. In the SR latch 904, the set input is provided to a power terminal of the first inverter 908. Additionally, the reset input is provided in a power terminal of the second inverter 912.

Figure 9B:
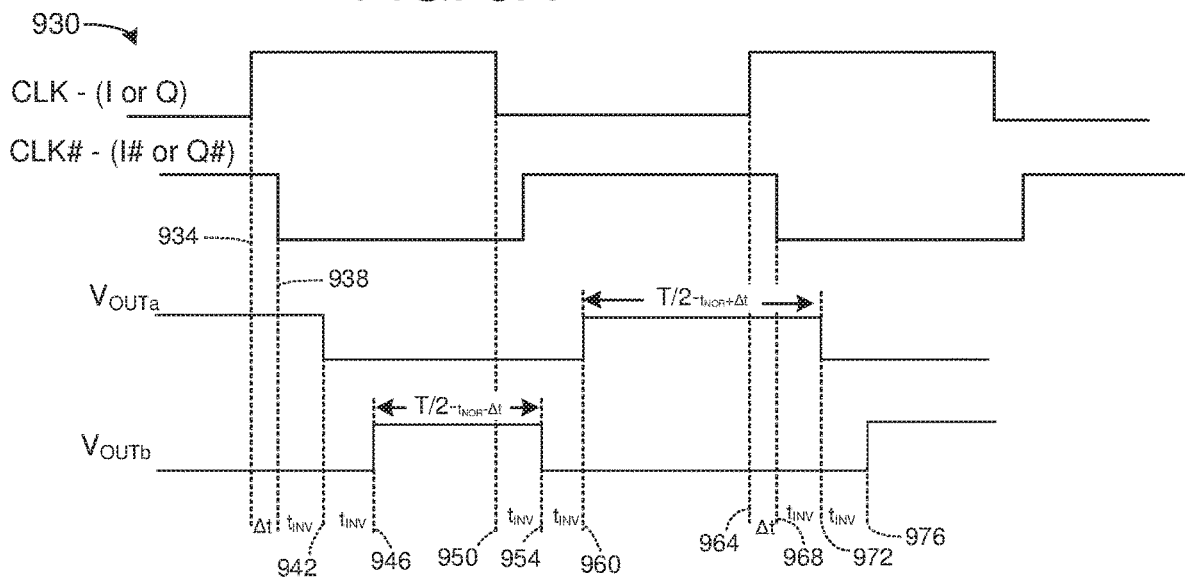
FIG. 9B illustrates a timing diagram for signals processed by the differential skew detector of FIG. 9A.

FIG. 9B illustrates a timing diagram 930 that plots the input and the output of the SR latch 904. In particular, the timing diagram includes lines characterizing the clock signal, CLK, which could be the in-phase signal, I or the quadrature signal, Q, and the inverted clock signal, CLK #, which could be the inverted quadrature clock signal, Q # or the inverted in-phase signal, I #. Additionally, the timing diagram 930 includes plots for the first output, $V_{OUTa}$ and the second output signal, $V_{OUTb}$ of the SR latch 904. For purposes of simplification of explanation, each of the clock signal, CLK, the inverted clock signal, CLK #, the first output, $V_{OUTa}$ and the second output signal, $V_{OUTb}$ are output on the same timeline.

In the timing diagram 930, a first rising edge 934 of the reference clock signal, CLK induces a first falling edge 938 at the inverted clock signal, CLK # the first output signal, $V_{OUTa}$. Additionally, the first falling edge 938 of the inverted clock signal, CLK # causes a first falling edge 942 of the first output signal, $V_{OUTa}$. The time interval between the first rising edge 934 of the reference clock signal, CLK and the first falling edge 938 of the inverted clock signal, CLK # defines a skew, Δt between the reference clock signal, CLK and the inverted clock signal, CLK #. During the skew, Δt between the reference clock signal, CLK and the inverted clock signal, CLK #, the SR latch 904 is in an illegal or restricted state. That is, the SR latch 904 is in the illegal or restricted state when both the reference clock signal, CLK and the inverted clock signal, CLK # (a set of differential clock signals) are both asserted (e.g., high state).

The first falling edge 942 of the output signal, $V_{OUTa}$ causes a first rising edge 946 of the second output signal, $V_{OUTb}$. The time interval between the first falling edge 938 of the inverted clock signal, CLK # and the first falling edge 942 of the first output signal, $V_{OUTa}$ as well as the time interval between the first falling edge 942 of the first output signal, $V_{OUTa}$ and the first rising edge 946 of the second voltage output signal, $V_{OUTb}$ is referred to as an inverter delay, labeled $t_{INV}$ in the timing diagram 930. The inverter delay, $t_{INV}$ is induced by a delay of the first inverter 908 and the second inverter 912 of the SR latch 904.

Additionally, a first falling edge 950 of the reference clock signal, CLK induces a first falling edge 954 of the second output signal, $V_{OUTb}$ after another inverter delay, $t_{INV}$. After another delay interval, $t_{INV}$ a first rising edge 960 of the first output signal, VOUTa is induced.

Furthermore, a second rising edge 964 of the reference clock signal, CLK induces a second falling edge 968 in the inverted clock signal, CLK #, after another interval of skew, Δt. The second falling edge 968 of the inverted clock signal, CLK # induces a second falling edge 972 in the first output signal, $V_{OUTa}$ after another inverter delay, $t_{INV}$. Following another inverter delay, $t_{INV}$, a second rising edge 976 is induced on the second output signal, $V_{OUTb}$.

Similar to the SR latch 804 of FIG. 8A, as illustrated, both the first output signal, VOUTa and the second output signal, VOUTb of the SR latch 904 have a duty cycle that is less than 50%. More particularly, the first output signal, VOUTa has a pulse width defined by the time interval between the first rising edge 960 and the second falling edge 968 of the first output signal, VOUTa. Similarly, the second output signal, VOUTb has a pulse width defined by the time interval between the first rising edge 946 and the first falling edge 954 of the second output signal, VOUTb. Equation 5 can be employed to define the pulse width, $PW_{VOUTa}$ for the first output signal, VOUTa, and Equation 6 can be employed to define the pulse width $PW_{VOUTb}$ for the first output signal, VOUTb.

$$PW_{VOUTa} = \frac{T}{2} - t_{INV} + \Delta t \quad \text{Equation 5}$$

$$PW_{VOUTb} = \frac{T}{2} - t_{INV} - \Delta t \quad \text{Equation 6}$$

wherein:
T is the period for the CLK and the inverted second signal, CLK #;
$t_{INV}$ is the inverter delay;
Δt is the skew between the reference clock signal, CLK and the inverted clock signal, CLK #; and
Δt<$t_{NOR}$.

As demonstrated by Equations 5 and 6, the difference in the pulse width, $PW_{VOUTa}$ for the first output signal, VOUTa, the pulse width $PW_{VOUTb}$ for the first output signal, VOUTb is equal to twice the skew, Δt between the reference clock signal, CLK (I or Q) and the inverted clock signal, CLK # (I # or Q #). As frequency of the reference clock signal, CLK and the inverted clock signal, CLK # increase, such as to a range of about 2.5 GHz to about 14 GHz, the skew, Δt can be 500 fs or less, which can be difficult to measure directly (e.g., with logical gates). Thus, by employing the differential skew detector 900, the skew, Δt can be determined indirectly (e.g., through logical subtraction).

In FIG. 9A, the first output signal, $V_{OUTa}$ and the second output signal, $V_{OUTb}$ can be input into the signal comparator 812 described with respect to FIG. 8A that can determine a difference (in voltage) between the first output signal, VOUTa and the second output signal, VOUTb. The signal comparator 812 can determine a DC component (e.g., average value) of the first output signal and the second output signal, for the in-phase signal, I and the inverted in-phase signal, I #, which DC component voltages can be referred to as a first in-phase DC signal, $VDC_{VOUTa-I,I\#}$ and a second in-phase DC signal, $VDC_{VOUTb-I,I\#}$. Similarly, the signal comparator 812 can determine a DC component (e.g., average value) of the first output signal and the second output signal, for the quadrature signal, Q and the inverted quadrature signal, Q #, which DC component voltages can be referred to as a first quadrature voltage DC signal, $VDC_{VOUTa-Q,Q\#}$ and a second quadrature DC signal, $VDC_{VOUTb-Q,Q\#}$.

The signal comparator 112 can determine an in-phase difference voltage, $VDIFF_I$ by subtracting the second in-phase DC signal, $VDC_{VOUTb-I,I\#}$ from the DC component of the first in-phase voltage output signal, $VDC_{VOUTa-I,I\#}$. The signal comparator 112 can also determine a quadrature difference voltage, $VDIFF_Q$ by subtracting the second quadrature DC signal, $VDC_{VOUTb-Q,Q\#}$ from the first quadrature DC signal, $VDC_{VOUTa-Q,Q\#}$.

Figure 9C:
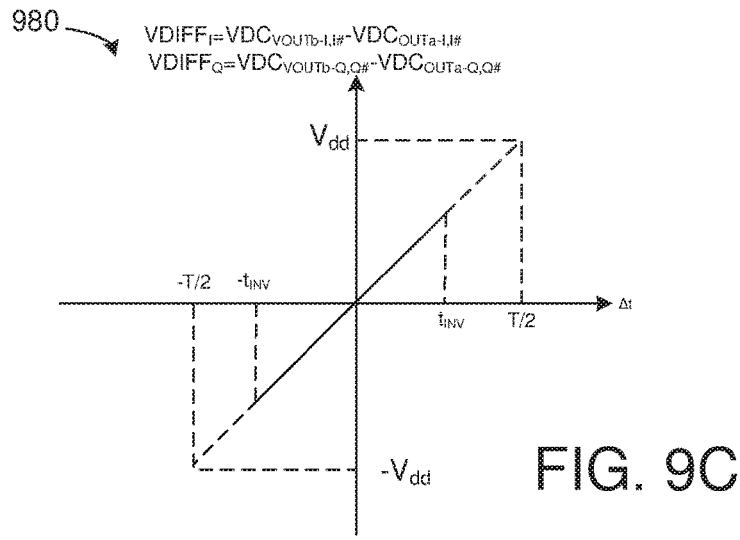
FIG. 9C illustrates a graph that plots a difference voltage as a function of clock skew.

FIG. 9C illustrates a graph 980 that plots the in-phase difference voltage, $VDIFF_I$ and the quadrature difference voltage, $VDIFF_Q$ for the SR latch 904 as a function of a skew, Δt between the reference clock signal, CLK (I or Q) and the inverted clock signal, CLK # (I # or Q #). As illustrated, the in-phase difference voltage, $VDIFF_I$ and the quadrature difference voltage, $VDIFF_Q$ are at least a voltage level that corresponds to the inverter delay, $t_{INV}$ (e.g., for the skew, Δt=0). Additionally, the in-phase difference voltage, $VDIFF_I$ and the quadrature difference voltage, $VDIFF_Q$ have a maximum of a power terminal voltage, $V_{dd}$ for the SR latch 904, which would correspond to a maximum skew, Δt, where Δt≈T/2. A combination of the in-phase difference voltage, $VDIFF_I$ and the quadrature difference voltage, $VDIFF_Q$ can be referred to as a difference error (e.g., skew) between differential clock signals in the four-phase clock signal set, CLK-4. Thus, the in-phase difference voltage, $VDIFF_I$ and the quadrature difference voltage, $VDIFF_Q$ can be provided to another component for analysis.

As compared to the SR latch 804 of FIG. 8A, the SR latch 904 (using the first inverter 908 and the second inverter 912), has a reduced load to the four-phase clock signal set, CLK-4, thereby reducing power consumption. Additionally, the inverter delay, $t_{INV}$ is a shorter time interval than the NOR gate delay, $t_{NOR}$, thereby curtailing offset of the phases of the four-phase clock signal set, CLK-4.

Referring back to FIG. 5, the error detector 544 can encode data in the feedback signal characterizing a differential error for each pair of differential clock signals of the four-phases (component clock signals) of the adjusted clock signal set, CLK-4 ADJUST. The clock corrector 540 of the buffer and correction module can analyze the feedback signal. In particular, the clock corrector 540 can include a duty cycle corrector 570 can analyze data encoded in the feedback signal to identify which phases (if any) of the four-phase clock signal set, CLK-4 need adjusted to ensure that each phase has a duty cycle of 50%. Additionally, the clock corrector 540 can include a quadrature error corrector 574 can analyze data encoded in the feedback signal in determine which phases (if any) of the four-phase clock signal set, CLK-4 need adjusted to ensure that each phase is 90 degrees out of phase. Further, the clock corrector 540 can include a differential skew corrector 578 that can analyze data encoded in the feedback signal to determine which differential clock signals of the four-phase clock signal set, CLK-4 need adjusted to ensure that differential clock signals are 180 degrees out of phase.

In response to such determinations, the clock corrector 540 can generate and/or modify the control signal, CONTROL, such that the clock path control module 536 can provide the adjusted four-phase clock signal set, CLK-4_ADJSUT. The adjusted four-phase clock signal set, CLK-4_ADJSUT can be provided to the second serializer stage 528.

The second serializer stage 528 can include a re-time and fanup module 582 that can combine channels and make timing adjustments to the 8 channel bitstream, DIN-8 provided from the first serializer stage 516. The re-time and fanup module 582 can provide a re-timed combined 4 channel bitstream, DIN-4-RET to an array of multiplexers 584. In the example illustrated, there are 4 multiplexers in the 584 labeled G0-G3. Each multiplexer in the array of multiplexers 584 can be a 4:1 multiplexer that can serialize 4 bits on a given channel of the 4 channel bitstream, DIN-4_RET based on the adjusted four-phase clock signal set, CLK-4_ADJUST. Thus, the array of multiplexers 520 can generate a single channel bitstream, DIN-S that is provided to a differential output driver 586. In response the differential output driver 586 generates a double-ended data signal, OUT-P and OUT-N.

Figure 10:
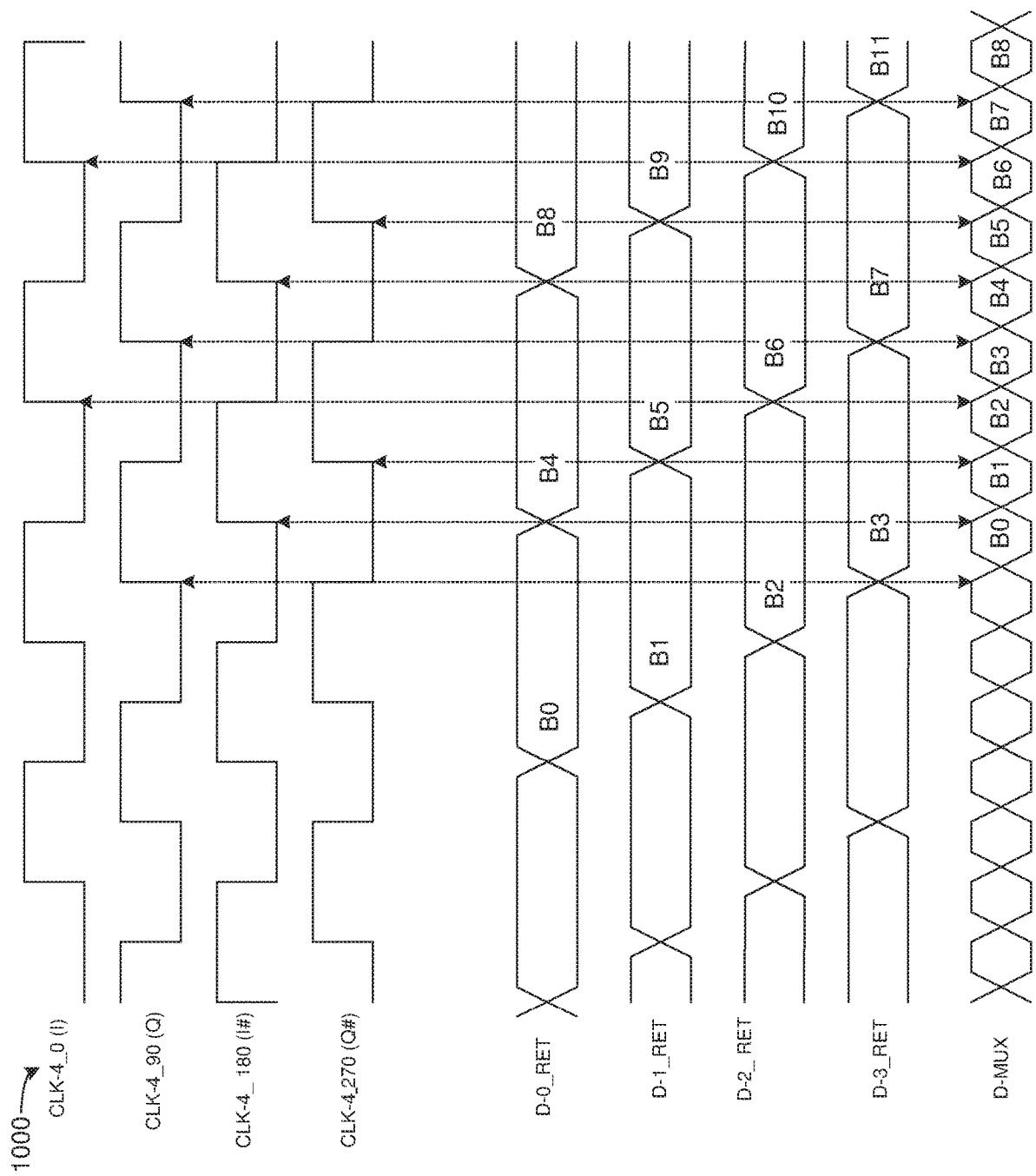
FIG. 10 illustrates a timing diagram for a serializer.

FIG. 10 illustrates a timing diagram 1000 that plots four-phases of a four-phase clock signal set, CLK-4 such as the adjusted clock signal CLK-4_ADJUST. The timing diagram 1000 could represent the output of the operations of the array of multiplexers 584 that are employed to generate the single channel bitstream, DIN-S. The four-phase clock signal set, CLK-4 includes an in-phase clock signal, CLK-4_0 (I), that is phase shifted by 0 degrees, a quadrature clock signal, CLK-4_90 (Q) that is phase shifted by 90 degrees. The four-phase clock signal set, CLK-4 includes an inverted in-phase clock signal, CLK-4_180 (I #), that is phase shifted by 180 degrees and an inverted a quadrature clock signal, CLK-4_270 (Q #) that is phase shifted by 270 degrees.

The timing diagram 1000 also includes bitstreams, D-0_RET, D-1_RET, D2_RET and D3_RET that can represent outputs of individual multiplexers, such as multiplexers in the array of multiplexers 584 of FIG. 5. An output signal, D-MUX represents a combined, serialized version of the bitstreams, D-0_RET, D-1_RET, D2_RET and D3_RET. More particularly, as illustrated, consecutive rising edges on the phases of the four-phase clock signal set, CLK-4_0 (I), CLK-4_90(Q), CLK-4_180(I #) and CLK-4_270(Q #) cause encoding of bits B0-B8 in the bitstreams D-0_RET, D-1_RET, D2_RET and D3_RET to provide the data in the output signal, D-MUX. In this manner, the bit rate of the output signal, DMUX is four times the frequency of the four-phase clock signal set, CLK-4. Moreover, as is apparent, phase shift in any of the clock signals, CLK-4_0 (I), CLK-4_90(Q), CLK-4_180(I #) and CLK-4_270(Q #) would cause bits B0-B8 to be shortened or lengthened. However, due to operations of a buffer and correction module (e.g., the buffer and correction module 534 of FIG. 5), each of the bits B0-B8 have even spacing because each phase of the clock signals, CLK-4_0 (I), CLK-4_90(Q), CLK-4_180(I #) and CLK-4_270(Q #) is properly phase shifted.

Referring back to FIG. 5, by curtailing the skew and quadrature error in the four-phase clock signal set, CLK-4, bit lengths in the single channel bitstream, OUT-P and OUT-N are more consistent, thereby reducing error and increasing bandwidth of the serializer 500.

Figure 11:
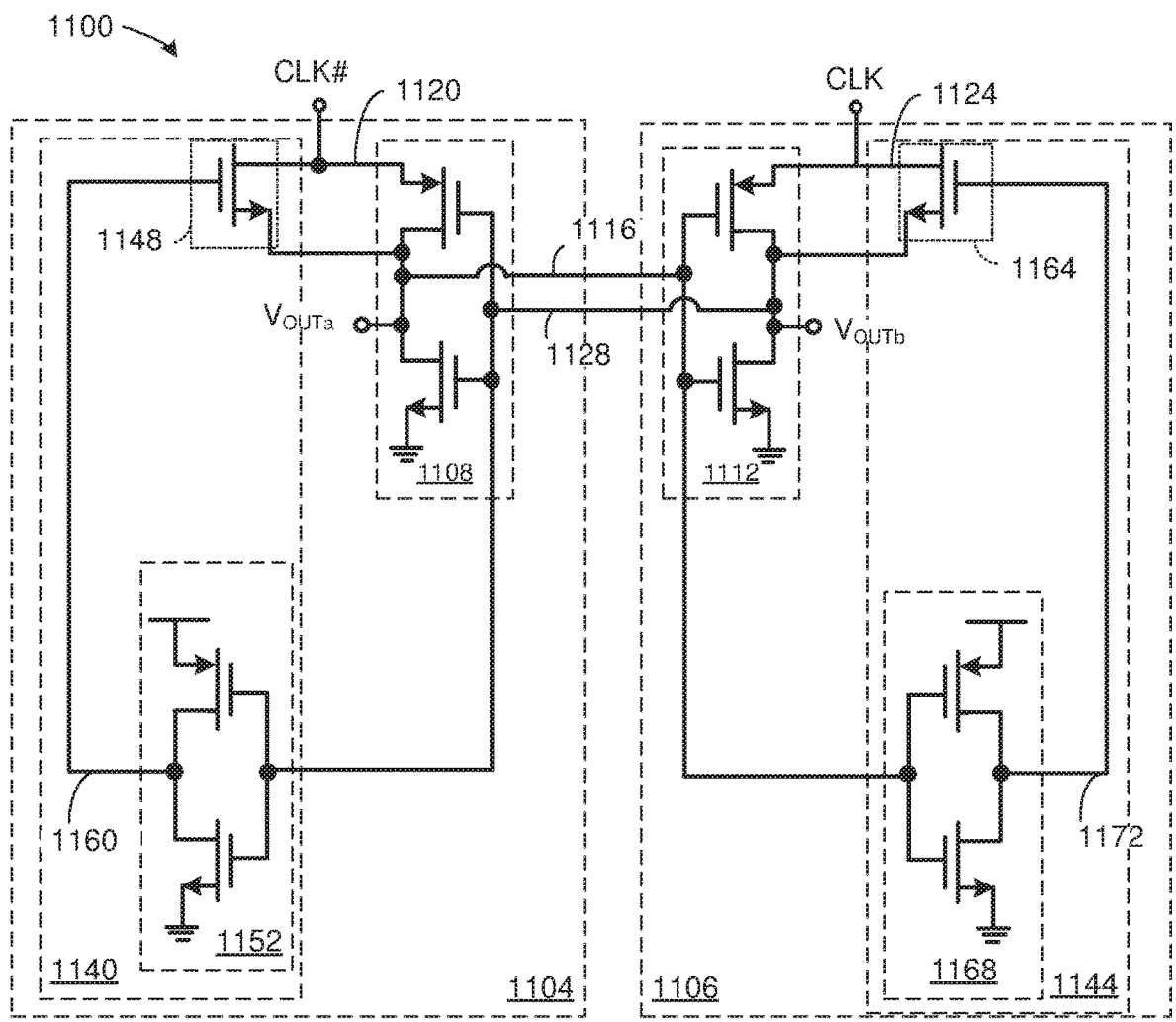
FIG. 11 illustrates a circuit diagram for an SR latch that is employable in a specific implementation of a differential skew detector.

FIG. 11 illustrates a circuit diagram of an example of an SR latch 1100 that is employable in a differential skew detector. The SR latch 1100 can be employed to implement the SR latch 108 of FIG. 1 and/or the SR latch 904 of FIG. 9A. The SR latch 1100 can be formed with n-channel and p-channel metal-oxide semiconductor field effect transistors (NMOSs and PMOSs). The SR latch 1100 is formed with two mirrored circuit sub-modules, namely, a first sub-module 1104 and a second sub-module 1106.

The SR latch 1100 receives a pair of differential clock signals, namely, a reference clock signal, CLK and an inverted clock signal, CLK #. The reference clock signal, CLK and the inverted clock signal, CLK # are set to be 180 degrees out of phase. As illustrated in FIGS. 2 and 9B, in some situations, there can be clock skew between the reference clock signal, CLK and the inverted clock signal, CLK #, such that adjustments to the phase of the reference clock signal, CLK and/or the inverted clock signal, CLK # are needed.

The first sub-module 1104 includes a first complementary MOS (CMOS) inverter 1108 and the second sub-module 1106 includes a second CMOS inverter 1112. A first bridge node 1116 couples an output node of the first CMOS inverter 1108 with an input node of the second CMOS inverter 1112. The output node of the first CMOS inverter 1108 that is coupled to the first bridge node 1116 also provides a first output signal, $V_{OUTa}$ of the SR latch 1100. The first output signal, $V_{OUTa}$ corresponds to a Q output of the SR latch 1100. A power terminal node 1120 of the first inverter (e.g., Vdd) is driven by the inverted clock signal, CLK #.

In a similar arrangement, a power terminal node 1124 of the second CMOS inverter 1112 is coupled to the clock signal, CLK. Additionally, a second bridge node 1128 coupled to an output node of the second CMOS inverter 1112 and an input node of the first CMOS inverter 1108 provides a second output signal, $V_{OUTb}$ of the SR latch 1100. The second output signal, $V_{OUTb}$ corresponds to an inverted output, Q # of the SR latch 1100.

The first sub-module 1104 includes a first auxiliary path 1140 and the second sub-module 1106 includes a second auxiliary path 1144. The first auxiliary path 1140 reduces a fall time of the first output signal, $V_{OUTa}$, and the second auxiliary path 1144 reduces a fall time of the second output signal, $V_{OUTb}$.

The first auxiliary path 1140 includes a first NMOS 1148 and a third CMOS inverter 1152. The third CMOS inverter 1152 has an input node coupled to an input node of the first CMOS inverter 1108, which is coupled to the second bridge node 1128. The first NMOS 1148 has a source coupled to the first bridge node 1116 and a drain coupled the power terminal node 1120 of the first CMOS inverter 1108. That is, the drain of the first NMOS 1148 is driven by the inverted clock signal, CLK #. A gate of the first NMOS 1148 is coupled to an output node 1160 of the third CMOS inverter 1152.

The second auxiliary path 1144 is arranged in a manner similar to the first auxiliary path 1140. More particularly, the second auxiliary path 1144 includes a second NMOS 1164 and a fourth CMOS inverter 1168. The fourth CMOS inverter 1168 has an input node coupled to the first bridge node 1116 and an output node 1172 coupled to a gate of the second NMOS 1164. The second NMOS 1164 has a source coupled to the second bridge node 1128 and a drain coupled the power terminal node 1124 of the second CMOS inverter 1112. That is, the drain of the second NMOS 1164 is driven by the clock signal, CLK.

In operation, during a clock pulse (e.g., high state) of the inverted clock signal, CLK #, the reference clock signal, CLK is a low state. During this interval, a PMOS of the first CMOS inverter 1108 is turned on, and an NMOS of the first CMOS inverter 1108 is turned off, such that the clock pulse of the inverted clock signal, CLK # drives the first output signal, $V_{OUTa}$ to a high state. Contemporaneously, the low state of the reference clock signal, CLK and the high state of the first bridge node 1116 (coupling the output node of the first CMOS inverter 1108 and the input node of the second CMOS inverter 1112) turns on an NMOS of the second CMOS inverter 1112, such that the second output signal, $V_{OUTb}$ is driven to the low state.

Conversely, during a clock pulse (e.g., high state) of the clock signal, CLK, the inverted clock signal, CLK # is a low state. During this interval, a PMOS of the second CMOS inverter 1112 is turned on, and the NMOS of the second CMOS inverter 1112 is turned off, such that the clock pulse of the reference clock signal, CLK drives the second output signal, $V_{OUTb}$ to a high state. Contemporaneously, the low state of the inverted clock signal, CLK # and the high state of the second bridge node 1128 (coupling the output node of the second CMOS inverter 1112 with the input node of the first CMOS inverter 1108) turns on the NMOS of the first CMOS inverter 1108, such that the first output signal, $V_{OUTa}$ is driven to the low state.

Additionally, the SR latch 1100 is configured such that during an illegal or restricted state, such that both the reference clock signal, CLK and the inverted CLK signal, CLK # are in the high state (due to clock skew), the state of the first output signal, $V_{OUTa}$ and the second output signal, $V_{OUTb}$ remain in a previous state until a next falling edge of the reference clock signal, CLK or the inverted CLK signal, CLK # is detected.

By implementing the SR latch 1100 in the manner illustrated, power consumption is reduced, because the clock signal, CLK and the inverted signal, CLK # power the first CMOS inverter 1108 and the second CMOS inverter 1112 of the SR latch 1100. Additionally, the first auxiliary path 1140 and the second auxiliary path 1144 provide current paths during a falling edge for the first output signal, $V_{OUTa}$ and the second output signal, $V_{OUTb}$, thereby improving response time of the SR latch 1100.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory medium having machine-readable instructions characterizing an integrated circuit (IC) chip, the IC chip comprising:
   a buffer and correction module that receives a set of multiphase clock signals at a given frequency, the buffer and correction module comprising a differential skew detector that detects a skew between signals of the set of multiphase clock signals, the skew detector comprising:
   a set of set-reset (SR) latches, wherein differential clock signals of the set of multiphase clock signals are input into each SR latch, the differential clock signals of the set of multiphase clock signals being set to be 180 degrees out of phase, and a voltage difference between a direct current (DC) component of a first output signal and a DC component of a second output signal of a respective SR latch in the set of SR latches varies as a function of the skew between the differential clock signals of the set of multiphase clock signals.

2. The medium of claim 1, wherein the first output signal and the second output signal of each SR latch of the set of SR latches has a duty cycle of less than 50%.

3. The medium of claim 2, wherein a first output signal provided by a given SR latch in the set of SR latches has a first pulse width and a second output signal provided by the second output of the given SR latch has a second pulse width, wherein a difference between the first pulse width and the second pulse width is proportional to the skew between the differential clock signals input into the given SR latch.

4. The medium of claim 3, wherein an interval of time that the differential clock signals input into the given SR latch are both asserted is proportional to the skew between the respective pair of signals input into the given SR latch.

5. The medium of claim 1, wherein each SR latch in the set of SR latches comprises a pair of NOR gates, a delay of a respective SR latch varies as a function of delay in a respective pair of NOR gates.

6. The medium of claim 1, wherein each SR latch in the set of SR latches comprises a pair of inverters, and a delay of a respective SR latch varies as a function of delay in a respective pair of inverters.

7. The medium of claim 6, wherein each inverter receives a respective clock signal of the set of multiphase clock signals at a power terminal of a respective inverter.

8. The medium of claim 7, wherein each SR latch comprises auxiliary paths each comprising a complementary metal-oxide semiconductor (CMOS) inverter to reduce a fall time of the first output signal and the second output signal of a respective SR latch.

9. The medium of claim 1, wherein the set of multiphase clock signals is a four-phase clock signal set, and the set of SR latches comprises a first SR latch and a second SR latch, a first set of differential clock signals of the four phase clock signal set are set to be 180 degrees out of phase being input into the first SR latch, a second set of differential clock signals of the four-phase clock signal set are set to be 180 degrees out of phase being input into the second SR latch.

10. The medium of claim 9, wherein data characterizing the skew between the first set of differential clock signals and a data characterizing the skew between the second set of differential clock signals is provided to a differential error corrector of the buffer and correction module, wherein the buffer and correction module controls an inverter array to adjust phases of the four-phase clock signal set to curtail skew between phases of the four-phase clock signal set to generate an adjusted four-phase clock signal set.

11. The medium of claim 10, wherein the IC chip characterized by the machine-readable instructions further comprises:
   a first serializer stage controlled by the four-phase clock signal set; and
   a second serializer stage downstream from the first serializer stage controlled by the adjusted four-phase clock signal set.

12. An integrated circuit (IC) chip, the IC chip comprising:
   a buffer and correction module that receives a set of multiphase clock signals at a given frequency, the buffer and correction module comprising a differential skew detector that detects a skew between signals of the set of multiphase clock signals, the skew detector comprising:
      a set of set-reset (SR) latches, wherein a set of differential clock signals of the set of multiphase clock signals are input into each SR latch, each set of differential clock signals of the set of multiphase clock signals being set to be 180 degrees out of phase, and a voltage difference between a direct current (DC) component of a first output signal and a DC component of a second output signal of a respective SR latch in the set of SR latches varies as a function of the skew between a respective set of differential clock signals of the set of multiphase clock signals.

13. The IC chip of claim 12, wherein the first output signal and the second output signal of each SR latch has a duty cycle of less than 50% and the first output signal provided by a given SR latch in the set of SR latches has a first pulse width and a second output signal provided by the given SR latch has a second pulse width, wherein a difference between the first pulse width and the second pulse width is proportional to the skew between the respective pair of differential clock signals input into the given SR latch.

14. The IC chip of claim 13, wherein an interval of time that the differential clock signals input into a given SR latch are both asserted is proportional to the skew between the differential clock signals input into the given SR latch.

15. The IC chip of claim 13, wherein each SR latch in the set of SR latches comprises a pair of NOR gates, a delay of a respective SR latch varies as a function of delay in a respective pair of NOR gates.

16. The IC chip of claim 13, wherein each SR latch in the set of SR latches comprises a pair of inverters, and a delay of a respective SR latch varies as a function of delay in a respective pair of inverters and each inverter gate receives a respective clock signal of the set of multiphase clock signals at a power terminal of a respective inverter gate.

17. The IC chip of claim 16, wherein each SR latch comprises auxiliary paths each comprising a complementary metal-oxide semiconductor (CMOS) inverter to reduce a fall time of the first output signal and the second output signal of a respective SR latch.

18. The IC chip of claim 13, wherein the set of multiphase clock signals is a four-phase clock signal set, and the set of SR latches comprises a first SR latch and a second SR latch, a first set of differential clock signals that are set to be 180 degrees out of phase being input into the first SR latch and a second set of differential clock signals that are set to be 180 degrees out of phase being input into the second SR latch.

19. An integrated circuit (IC) chip, the IC chip comprising:
   a first serializer stage comprising a first multiplexer array that encodes a multichannel bitstream based on a four-phase clock signal set at a given frequency to generate a second multichannel bitstream;
   a buffer and correction module that receives the four-phase clock signal set at the given frequency, the buffer and correction module comprising:
      a differential error detector that detects a skew between signals of the four-phase clock signal set, the differential error detector comprising:
         a first set-reset (SR) latch, wherein a first set of differential clock signals of the four-phase clock signal set are input into the first SR latch, the first set of differential clock signals of the four-phase clock signal set being set to be 180 degrees out of phase and a direct current (DC) component of a first output signal and a DC component of a second output signal of the first SR latch varies as a function of the skew between the first set of differential clock signals of the four-phase clock signal set; and
         a second SR latch, wherein a second set of differential clock signals of the four-phase clock signal set are input into the second SR latch, the second set of differential clock signals of the four-phase clock signal set being set to be 180 degrees out of phase and a DC component of a first output signal and a DC component of a second output signal of the second SR latch varies as a function of the skew between the second set of differential clock signals of the four-phase clock signal set; and
      a differential error corrector that controls a clock path control module to adjust phases of the four-phase clock signal set to form an adjusted four-phase clock signal set based on data characterizing the skew between the first set of differential signals and the second set of differential signals; and
   a second serializer stage comprising a second plurality of multiplexers that encodes the second multichannel bitstream signal based on the adjusted four-phase clock signal set to generate a serialized data signal.

20. The IC chip of claim 19, wherein the buffer and correction module adjusts a duty cycle and a quadrature error of the four-phase clock signal set to form the adjusted four-phase clock signal set.

* * * * *